United States Patent
Loureiro

(10) Patent No.: US 12,437,077 B2
(45) Date of Patent: Oct. 7, 2025

(54) MONITORING AND REMEDIATION OF CYBERSECURITY RISK BASED ON CALCULATION OF CYBER-RISK DOMAIN SCORES

(71) Applicant: CYBER CONNECTIVE CORPORATION, Wilmington, DE (US)

(72) Inventor: Rodrigo Ernesto Santos Loureiro, Haymarket, VA (US)

(73) Assignee: CYBER CONNECTIVE CORPORATION, Wilmington, DE (US)

( * ) Notice: Subject to any disclaimer, the term of this patent is extended or adjusted under 35 U.S.C. 154(b) by 306 days.

(21) Appl. No.: 17/970,449

(22) Filed: Oct. 20, 2022

(65) Prior Publication Data

US 2024/0134990 A1 Apr. 25, 2024
US 2024/0232367 A9 Jul. 11, 2024

(51) Int. Cl.
*H04L 29/06* (2006.01)
*G06F 21/57* (2013.01)

(52) U.S. Cl.
CPC ...... *G06F 21/577* (2013.01); *G06F 2221/034* (2013.01)

(58) Field of Classification Search
CPC .......................... G06F 21/577; G06F 2221/034
See application file for complete search history.

(56) References Cited

U.S. PATENT DOCUMENTS

| 8,819,442 | B1* | 8/2014 | Gehrig | H04L 63/1433 |
| | | | | 713/180 |
| 9,118,702 | B2* | 8/2015 | MaCaulay | G06F 21/552 |
| 10,516,680 | B1* | 12/2019 | Vervier | H04L 63/1416 |
| 11,863,578 | B1* | 1/2024 | Speck | G06N 5/01 |
| 2016/0050225 | A1* | 2/2016 | Carpenter | G06F 21/577 |
| | | | | 726/25 |
| 2016/0234247 | A1* | 8/2016 | Ng | G06Q 40/08 |
| 2016/0248800 | A1* | 8/2016 | Ng | G06Q 40/06 |

(Continued)

FOREIGN PATENT DOCUMENTS

WO WO-2016025226 A1 * 2/2016 ........... G06F 21/577

OTHER PUBLICATIONS

International Search Report and Written Opinion for Application No. PCT/US23/35610, mailed Feb. 14, 2024, 14 pages.

*Primary Examiner* — Shawnchoy Rahman
(74) *Attorney, Agent, or Firm* — Mannava & Kang, P.C.

(57) ABSTRACT

According to examples, an apparatus includes a processor that is to calculate scores for a plurality of cyber-risk domains related to cybersecurity of an organization. The processor is to generate a first dashboard to include a first set of cyber-risk domains that are assigned to a first role and the calculated scores for the first set of cyber-risk domains and to generate a second dashboard to include a second set of cyber-risk domains that are assigned to a second role in the organization. The processor is also to output the first dashboard to a first entity and to output the second dashboard to a second entity. Issues, such as threats, vulnerabilities, or the like, in the cybersecurity posture of the organization may readily be identified from the dashboards, which may enable early remediation of the issues and thus, reduced or minimized harm arising from the issues.

20 Claims, 11 Drawing Sheets

(56) References Cited

U.S. PATENT DOCUMENTS

| | | | |
|---|---|---|---|
| 2018/0129989 A1* | 5/2018 | Bowers | G06Q 10/0635 |
| 2019/0034846 A1* | 1/2019 | Mo | G06Q 10/0635 |
| 2019/0260764 A1 | 8/2019 | Humphrey et al. | |
| 2023/0156031 A1* | 5/2023 | Subramanian | H04L 63/14 |
| | | | 726/25 |

* cited by examiner

| 7/31/2022 | OVERALL SCORE | THREAT LEVEL | VULNERABILITY EXPOSURE | ENDPOINT HEALTH | NETWORK HEALTH | PUBLIC POSTURE |
|---|---|---|---|---|---|---|
| OVERALL SCORE | 7.0 6.6↑ | 7.0 7.0= | 6.0 4.3↑ | 7.9 7.9= | 6.1 6.1= | 7.9 7.9= |
| FORESTRY | 7.3 7.4↓ | 8.0 8.0= | 4.4 5.0↓ | 7.6 7.6= | 8.3 8.3= | 8.2 8.2= |
| ATTORNEY GENERAL | 6.2 5.5↑ | 6.0 6.0= | 5.0 1.6↑ | 6.8 7.6= | 5.1 5.1= | 8.0 8.0= |
| AGRICULTURE & CONSUMER SERVICES | 6.8 5.8↑ | 7.4 7.4= | 5.8 0.8↑ | 7.2 7.2= | 7.6 7.6= | 5.9 5.9= |
| COURTS | 7.7 7.6↑ | 8.1 8.1= | 5.1 4.5↑ | 7.8 7.8= | 8.5 8.5= | 9.1 9.1= |
| COLLEGES & UNIVERSITIES | 6.5 6.1↑ | 5.9 5.9= | 7.5 5.8↑ | 8.8 8.8= | 2.9 2.9= | 7.3 7.3= |
| CORRECTIONS | 7.2 7.2= | 6.7 6.7= | 6.9 7.0↓ | 7.8 7.8= | 5.6 5.6= | 8.8 8.8= |
| ENVIRONMENTAL PROTECTIONS | 7.2 6.8↑ | 6.8 6.8= | 7.4 5.7↑ | 9.1 9.1= | 4.6 4.6= | 7.9 7.9= |

DIVISIONS 302
312
314
CYBER-RISK DOMAINS 310
SECOND DASHBOARD 118B
SCORE 308

⊙ HOME ▷ ☐ EXCEED GOAL ▷ ☐ MEET GOAL ▷ ☐ UNDERPERFORM ▷ ☐ ENGAGEMENT NEEDED ▷ ☐ REMEDIATION NEEDED
⊙ CONNECTIVE ▷ ⊞ CEO DASHBOARD ▷ ⊞ CIO DASHBOARD ▷ ⊞ CISO DASHBOARD ▷ ○ APPLICATION

FIG. 3B

VULNERABILITIES BY AREA FOR 2022-10-11

FIRST INFORMATION TABLE
400

| | | TOTAL | | | | IN COMPLIANCE | | OUT OF COMPLIANCE | | TREND | | |
|---|---|---|---|---|---|---|---|---|---|---|---|---|
| AREA | ASSETS | TOTAL | INTERNET | INTERNAL | PEGRANTED | INTERNET | INTERNAL | INTERNET | INTERNAL | 7 DAY | 1 MONTH | YEAR |
| ↗ FACILITIES | 3770 | 13 | 0 | 13 | 0 | 0 | 0 | 0 | 13 | 13 | 13 | 13 |
| ↗ FINANCE | 31702 | 442 | 0 | 442 | 0 | 0 | 8 | 0 | 434 | 433 | 428 | 434 |
| ↗ FORESTRY | 21612 | 32 | 0 | 32 | 0 | 0 | 0 | 0 | 32 | 32 | 32 | 32 |
| ↗ HR | 9283 | 834 | 0 | 834 | 0 | 0 | 29 | 0 | 805 | 805 | 805 | 805 |
| ↗ LEGACY | 0 | 0 | 0 | 0 | 0 | 0 | 0 | 0 | 0 | 0 | 0 | 0 |
| ↗ LEGAL | 1733 | 46 | 0 | 46 | 0 | 0 | 22 | 0 | 24 | 24 | 24 | 24 |
| ↗ MARKETING | 0 | 0 | 0 | 0 | 0 | 0 | 0 | 0 | 0 | 0 | 0 | 0 |
| ↗ PRODUCTION | 4824 | 8 | 0 | 8 | 0 | 0 | 0 | 0 | 8 | 8 | 8 | 8 |
| ↗ SALES | 7244 | 1250 | 0 | 1250 | 0 | 0 | 37 | 0 | 1213 | 1213 | 1189 | 1213 |
| ↗ UNASSIGNED | 0 | 0 | 0 | 0 | 0 | 0 | 0 | 0 | 0 | 0 | 0 | 0 |
| TOTALS | 80168 | 2625 | 0 | 2625 | 0 | 0 | 96 | 0 | 2529 | 2528 | 2499 | 2529 |

FIG. 4A

VULNERABILITIES BY LOCALITY IN MARKETING AREA FOR 2022-10-11

| | | TOTAL | | | | IN COMPLIANCE | | OUT OF COMPLIANCE | | TREND | | |
|---|---|---|---|---|---|---|---|---|---|---|---|---|
| LOCALITY | ASSETS | TOTAL | INTERNET | INTERNAL | PEGRANTED | INTERNET | INTERNAL | INTERNET | INTERNAL | 7 DAY | 1 MONTH | YEAR |
| ⊞ FACILITIES | 3770 | 13 | 0 | 13 | 0 | 0 | 0 | 0 | 13 | 13 | 13 | 13 |
| ⊞ FINANCE | 31702 | 442 | 0 | 442 | 0 | 0 | 8 | 0 | 434 | 433 | 428 | 434 |
| ⊞ FORESTRY | 21612 | 32 | 0 | 32 | 0 | 0 | 0 | 0 | 32 | 32 | 32 | 32 |
| ⊞ HR | 9283 | 834 | 0 | 834 | 0 | 0 | 29 | 0 | 805 | 805 | 805 | 805 |
| ⊞ LEGACY | 0 | 0 | 0 | 0 | 0 | 0 | 0 | 0 | 0 | 0 | 0 | 0 |
| ⊞ LEGAL | 1733 | 46 | 0 | 46 | 0 | 0 | 22 | 0 | 24 | 24 | 24 | 24 |
| ⊞ MARKETING | 0 | 0 | 0 | 0 | 0 | 0 | 0 | 0 | 0 | 0 | 0 | 0 |
| ⊞ PRODUCTION | 4824 | 8 | 0 | 8 | 0 | 0 | 0 | 0 | 8 | 8 | 8 | 8 |
| ⊞ SALES | 7244 | 1250 | 0 | 1250 | 0 | 0 | 37 | 0 | 1213 | 1213 | 1189 | 1213 |
| ⊞ UNASSIGNED | 0 | 0 | 0 | 0 | 0 | 0 | 0 | 0 | 0 | 0 | 0 | 0 |
| TOTALS | 80168 | 2625 | 0 | 2625 | 0 | 0 | 96 | 0 | 2529 | 2528 | 2499 | 2529 |

SECOND INFORMATION TABLE
410

FIG. 4B

MONITORING AND REMEDIATION OF CYBERSECURITY RISK BASED ON CALCULATION OF CYBER-RISK DOMAIN SCORES

BACKGROUND

Cybersecurity, which may also be termed computer security or information technology security, may be defined as the protection of computer systems and networks from threats. The threats may include actions that seek to damage or steal data, disrupt services, computer virus attacks, denial of service attacks, data breaches, etc. Lapses or failures in identifying cybersecurity risks and threats often result in organizations being vulnerable to such threats. In many instances, organizations receive information pertaining to cybersecurity postures of the organizations from relatively large numbers of disparate sources and use that information to identify and prevent the threats. The number of disparate sources of information may be larger for organizations that are spread across multiple geographic locations and/or have multiple divisions.

BRIEF DESCRIPTION OF DRAWINGS

Features of the present disclosure are illustrated by way of examples shown in the following figures. In the following figures, like numerals indicate like elements, in which:

FIGS. 3A-3C, respectively, depict example dashboards that show scores for cyber-risk domains assigned to various roles in an organization, in accordance with embodiments of the present disclosure;

FIGS. 4A and 4B, respectively, show examples of information tables, in accordance with embodiments of the present disclosure;

DETAILED DESCRIPTION

Figure 1:
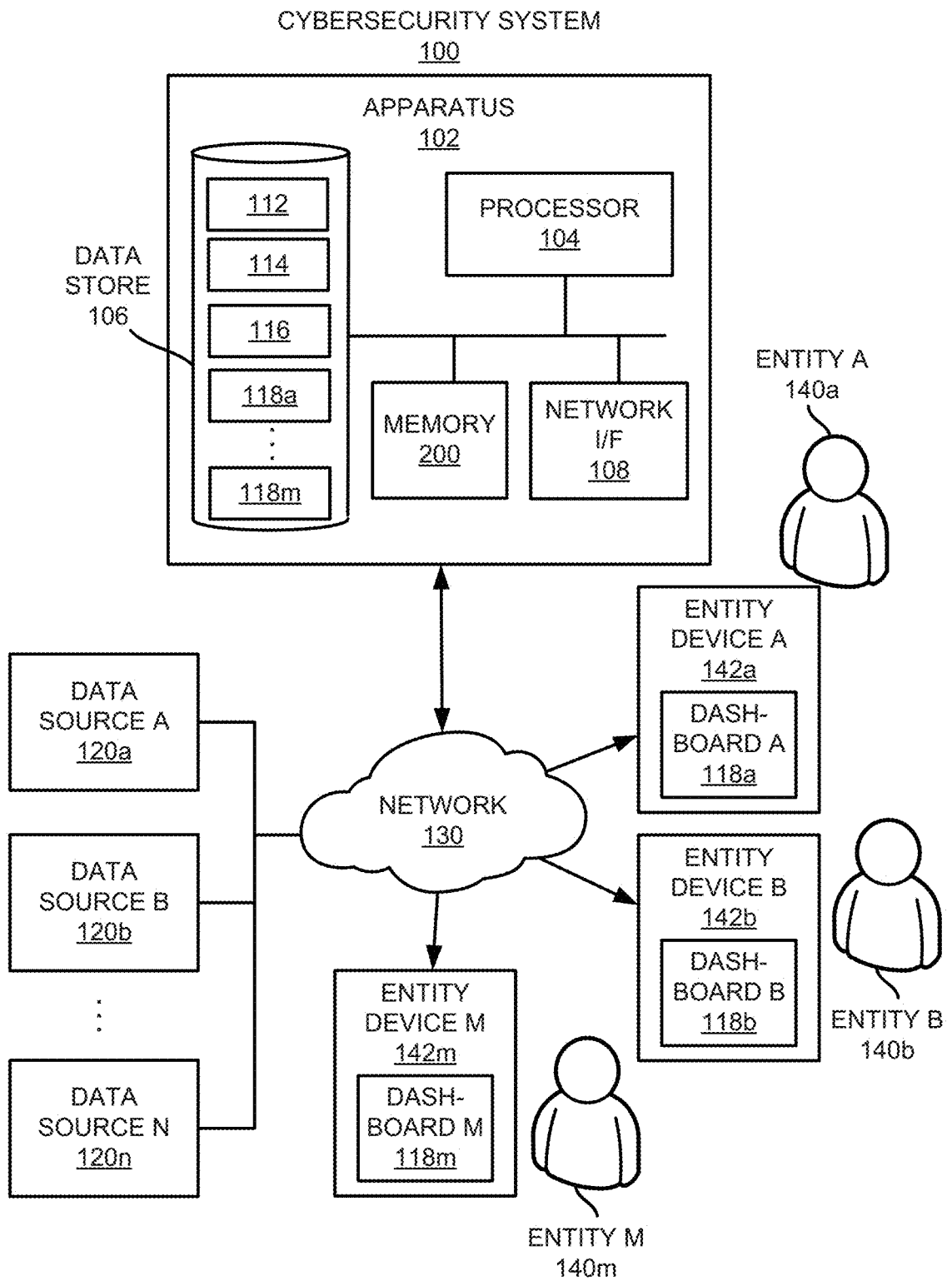
FIG. 1 shows a block diagram of a cybersecurity system, in accordance with an embodiment of the present disclosure.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

There are hundreds of providers of cybersecurity technology. These cybersecurity technology providers include providers of data protection services, risk and compliance services, network monitoring and operation services, vulnerability assessment and management services, endpoint security services, cloud security services, etc. The cybersecurity technology providers typically provide data in manners that are specific or proprietary to the providers and, thus, the data is often not interoperable with the data from other providers. In other words, the cybersecurity data provided by the providers may not be readily analyzed together or it may not be easy to determine how the data relates to each other.

Organizations, such as businesses, societies, associations, etc., often employ services from multiple cybersecurity technology providers and thus receive cybersecurity data having multiple types of formats. Larger organizations, including organizations that have presences across multiple geographic areas and/or multiple divisions, may use and collect data from large numbers of cybersecurity technology providers. As a result, personnel of the organizations may receive large amounts of data having different formats and may find it difficult to interpret how the data impacts the cybersecurity of the organizations. That is, for instance, the personnel, such as chief executive officers (CEOs), chief information security officers (CISOs), chief information officers (CIOs), or the like, may not be able to get an executive and global understanding of the organization's current cybersecurity posture from the data that they receive from the multiple types of cybersecurity data.

For instance, the personnel may be unable to accurately and easily determine areas where the current cybersecurity posture meets or exceeds certain thresholds and where the current cybersecurity posture falls below the certain thresholds from the cybersecurity collected data. Instead, the personnel may be required to parse through the data manually and understand how to interpret the data in their various formats in order to determine the current cybersecurity posture of their organization. In many instances, due to, for instance, the large volumes and the differences in the formats of the data, the personnel may find it difficult to determine the current cybersecurity posture. Additionally, the personnel may fail to identify certain security issues and thus, delivery of the cybersecurity data in their native formats may result in the lapses or failures in the identification of cybersecurity risks and threats. The lapses or failures in the identification of cybersecurity risks and threats may cause the organizations to be vulnerable to such threats, which may open up the organizations to attacks.

A technical issue associated with current techniques for providing personnel with cybersecurity data may thus be that security risks and threats may not be identified and remediated in a timely manner or identified and remediated at all. The delay or failure in identifying and remediating such risks and threats may cause an organization to be vulnerable to cybersecurity attacks for a relatively long period of time. In addition, the relatively long period of time during which the organization is vulnerable may result in the organization facing greater levels of harm, such as greater possibility of data loss, down time, data breach, etc.

Disclosed herein are apparatuses that monitor the cybersecurity posture of an organization and generate dashboards of cyber-risk domains of the cybersecurity posture using data collected from a plurality of disparate data sources. The apparatuses generate different dashboards for different entities dependent upon, for instance, the roles that the entities are assigned in the organization. Each of the dashboards includes scores calculated for the respective sets of cyber-risk domains assigned to the different roles. As a result, the dashboards may be tailored to the recipients of the dashboards based on their respective roles within the organization. In other words, the dashboards may be tuned to provide the recipients with cybersecurity information that may be most pertinent to the recipients, e.g., information that the recipients may rely upon in making cybersecurity decisions and remediation efforts. Particularly, the dashboards may provide the recipients with an overview of the cybersecurity posture of the organization, which the recipients may use to quickly and readily identify potential issues. Additionally, the dashboards may be generated and outputted using data that have been collected shortly prior to the dashboards being generated and outputted. In other words, the dashboards may be generated and outputted to enable real-time or near real-time monitoring and remediation of cybersecurity issues in the organization. This will allow the recipients to address or remediate the potential issues in an efficient manner.

Through implementation of features of the present disclosure, potential issues in the cybersecurity postures of organizations may be identified. In some instances, the potential issues may be issues that are identified through analysis of aggregations of data received from disparate data sources. In one regard, potential issues that may otherwise have been missed through analysis of the disparate data separately may be identified through implementation of the aggregation of data disclosed in the present disclosure. The potential issues caused by the analysis of the disparate data may affect the cybersecurity posture of the organizations and thus, a technical improvement afforded by the present disclosure is the improvement in the cybersecurity posture of the organizations through the identification, and in some instances, the remediation, of the potential cybersecurity issues. Another technical improvement is that issues, such as threats, vulnerabilities, or the like, in the cybersecurity posture of the organization may readily be identified from the dashboards, which may enable early remediation of the issues and thus, reduced or minimized harm arising from the issues. Furthermore, the dashboards may be generated to include identified cyber-risk domains and scores corresponding to a plurality of divisions of the organization. As a result, the dashboards may provide recipients of the dashboards with comprehensive and simultaneous monitoring of cybersecurity issues associated with the plurality of divisions of the organization.

In some examples, processors of the apparatuses disclosed herein may cause a remediation action to occur based on an analysis of the scores identified in the dashboards. Particularly, for instance, the processors may cause a remediation action related to the cyber-risk domain corresponding to a calculated score that falls below a predefined threshold level to occur. The remediation action may be an action that the processor may take to cause a root of the score to fall below the predefined threshold level to be blocked or otherwise remediated. This may be, for instance, to cause a vulnerability to be patched, a user to be suspended, a security control to be deployed, etc. In this regard, other technical improvements afforded through implementation of features of the present disclosure may include improvements to the cybersecurity posture of an organization through the determination and execution of remediation actions by a processor.

Figure 2:
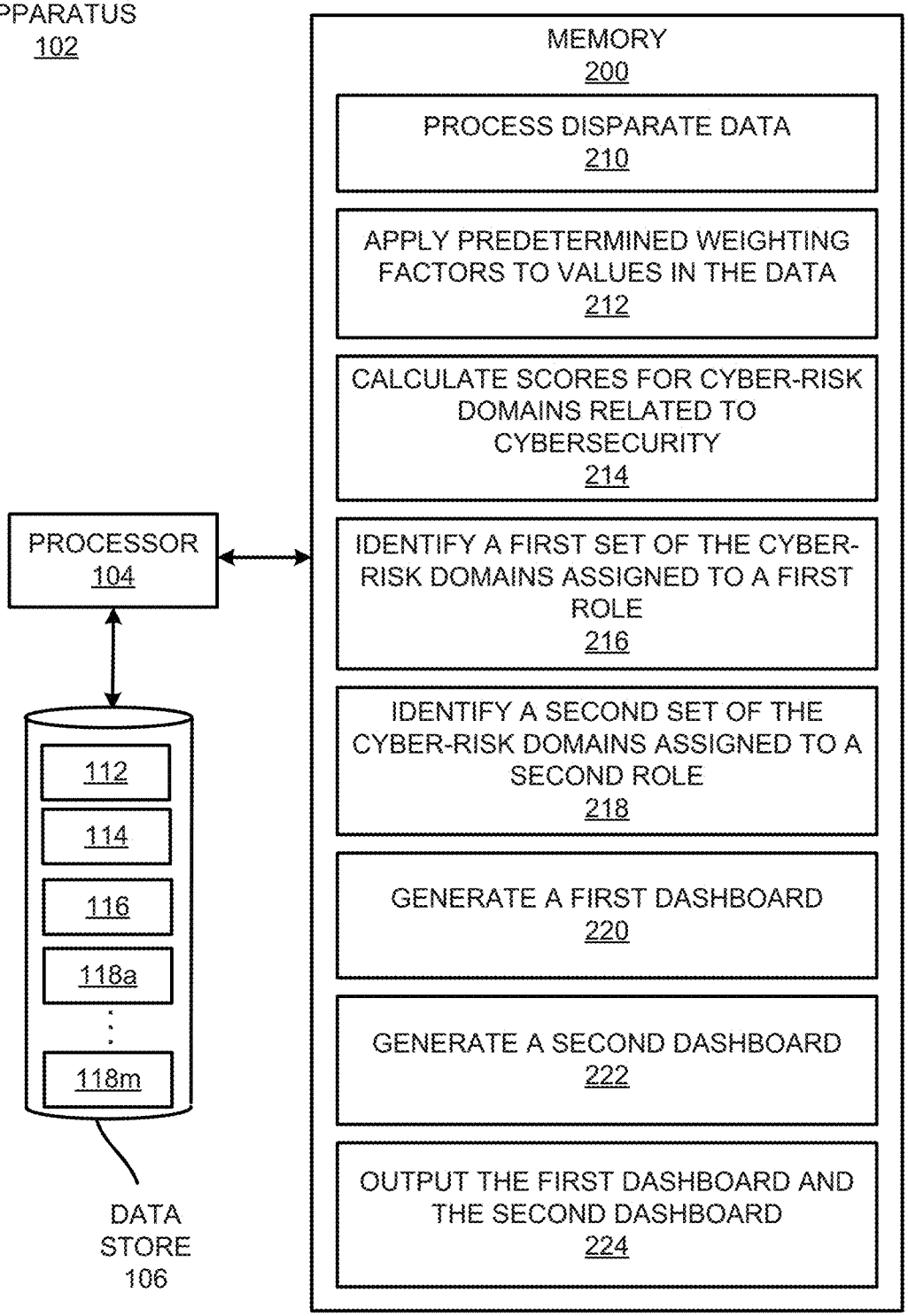
FIG. 2 depicts a block diagram of the apparatus depicted in FIG. 1, in accordance with an embodiment of the present disclosure.

Reference is first made to FIGS. 1 and 2. FIG. 1 shows a block diagram of a cybersecurity system 100, in accordance with an embodiment of the present disclosure. FIG. 2 depicts a block diagram of the apparatus 102 depicted in FIG. 1, in accordance with an embodiment of the present disclosure. It should be understood that the cybersecurity system 100 and the apparatus 102 of the cybersecurity system 100, in other examples, include additional features and that some of the features described herein may be removed and/or modified without departing from the scopes of the cybersecurity system 100 and/or the apparatus 102.

As shown in FIG. 1, the cybersecurity system 100 includes the apparatus 102, which is to, among other functions, collect data, process the collected data, calculate scores from the collected data, generate dashboards that include the scores, and output the dashboards to entity devices. As discussed in greater detail herein, the dashboards may provide entities with comprehensive information regarding the cybersecurity posture of their organization. The dashboards may also provide the information in a relatively simple and easy to read format such that the entities may readily make decisions based on the information. As a result, for instance, potential cybersecurity threats and vulnerabilities may be identified relatively quickly from the dashboards, which may enable the cybersecurity threats and vulnerabilities to also be addressed relatively quickly. By addressing the cybersecurity threats and vulnerabilities relatively quickly, e.g., shortly after the cybersecurity threats or vulnerabilities have occurred or are occurring, the potential for harm caused by the cybersecurity threats or vulnerabilities may be reduced or minimized.

The apparatus 102 is a computing device, such as a server computer, a laptop computer, a desktop computer, the like. By way of particular example, the apparatus 102 is a server computer of an organization and may be on the organization premises or on the cloud. The apparatus 102 is shown in FIGS. 1 and 2 as including a processor 104 that controls operations of the apparatus 102. The apparatus 102 is also depicted as including a data store 106 and a memory 200 on which data that the processor 104 accesses and/or executes are stored. The processor 104 is a semiconductor-based microprocessor, a central processing unit (CPU), an application specific integrated circuit (ASIC), a field-programmable gate array (FPGA), and/or other hardware device.

The data store 106 and the memory 200, which are also be termed computer-readable mediums, are each, for example, a Random Access memory (RAM), an Electrically Erasable Programmable Read-Only Memory (EEPROM), a storage device, or the like. In some examples, the memory 200 is a non-transitory computer readable storage medium, where the term "non-transitory" does not encompass transitory propagating signals. In any regard, the memory 200 has stored thereon machine-readable instructions that the processor 104 is to execute.

Although a single apparatus 102 is depicted as having a single processor 104, it should be understood that in other examples, multiple apparatuses 102 with additional processors and/or cores may be employed without departing from a scope of the apparatus 102. In this regard, references to a single processor 104 as well as to a single memory 200 should be understood to additionally or alternatively pertain to multiple processors 104 and multiple memories 200. Likewise, references to a single apparatus 102 may be understood to additionally or alternatively pertain to multiple apparatuses 102, such as multiple servers.

Reference is made to FIG. 1 and FIG. 2. In FIG. 2, the memory 200 is shown as having stored thereon machine-readable instructions 210-224 that the processor 104 is to execute. Although the instructions 210-224 are described herein as being stored on the memory 200 and thus include a set of machine-readable instructions, in some examples, the apparatus 102 includes hardware logic blocks that perform functions similar to the instructions 210-224. In these examples, the processor 104 additionally or alternatively includes hardware components that execute the instructions 210-224. In other examples, the apparatus 102 includes a combination of instructions and hardware logic blocks to implement or execute functions corresponding to the instructions 210-224. In any of these examples, the processor 104 implements the hardware logic blocks and/or executes the instructions 210-224. As discussed herein, the apparatus 102 may also include additional instructions and/or hardware logic blocks such that the processor 104 may execute operations in addition to or in place of those discussed herein with respect to FIG. 2.

The processor 104 is to execute the instructions 210 to process disparate types of values in data collected from multiple data sources 120a-120n to enable the values to be interoperable with each other. Various manners in which the processor 104 may process the disparate types of values are described in greater detail hereinbelow.

The processor 104 is to execute the instructions 212 to apply predetermined weighting factors to the values to generate weighted values. The predetermined weighting factors may be user defined and may be determined to the organization's needs, objectives, etc. The predetermined weighting factors may be chosen to be different for different types of values.

The processor 104 is to execute the instructions 214 to calculate, from the weighted values, scores for a plurality of cyber-risk domains related to the cybersecurity of an organization. The cybersecurity of the organization may include the protection of computer systems and networks from threats and/or vulnerabilities. In addition, the cyber-risk domains related to the cybersecurity of the organization may include any of a number of cyber-risk domains regarding the cybersecurity posture of the organization. In some examples, the cyber-risk domains are related to the cybersecurity postures of various divisions within the organization. The cybersecurity posture of the organization and/or the divisions within the organization may include information such as, the levels at which the organization is under threats, vulnerable to attacks, the levels at which divisions in the organization are under threats or are vulnerable to attacks, etc. Generally speaking, the cybersecurity posture of the organization may refer to the overall power, maturity, and efficacy of the cybersecurity controls and processes in place for the organization as well as its ability to detect and contain cyber-attacks or other security events. The cybersecurity posture may include aspects of cybersecurity ranging from digital infrastructure, digital application, software, firewalls, malware detection, antivirus, threat detection system, automation, and cybersecurity training, etc.

According to examples, the cyber-risk domains, e.g., a cybersecurity posture of the organization and/or divisions of the organization, may include a cyber-risk domain posture of the organization/divisions. The cyber-risk domain posture may include asset management information, business environment information, governance information, risk assessment information, risk management strategy information, etc. The cyber-risk domains may also include a protection posture of the organization/divisions. The protection posture may include access control information, awareness and training information, data security information, information protection processes and procedures information, maintenance information, protective technology information, etc.

The cyber-risk domains may further include a detection posture of the organization/divisions. The detection posture may include anomalies and events information, security continuous monitoring information, detection processes information, etc. The cyber-risk domains may further include a respond posture of the organization/divisions, which may include response planning information, communications information, analysis information, mitigation information, improvements information, etc. The cyber-risk domains may still further include a recover posture of the organization/divisions, which may include recovery planning information, improvements information, communications information, etc.

The cyber-risk domains may include a threat level posture of the organization/divisions, which may include information collected from a threat detection system. The cyber-risk domains may include a vulnerability exposure posture of the organization/divisions, which may include information collected from at least one vulnerability scanning service. The cyber-risk domains may include an endpoint health posture of the organization/divisions, which may include information collected from at least one detections and endpoints service. The cyber-risk domains may include a network health posture of the organization/divisions, which may include information collected from at least one service that tracks malicious network traffic. The cyber-risk domains may include a public posture of the organization/divisions, which may include information collected from at least one service that tracks external traffic and external posture.

The cyber-risk domains may include an endpoint detection and response (EDR) posture of the organization/divisions, which may include information collected from at least one EDR system. The cyber-risk domains may include an infrastructure posture of the organization/divisions, which may include information collected from at least one service that provides infrastructure security scans. The cyber-risk domains may include an application scanning posture of the organization/divisions, which may include information collected from at least one service that provides web application security scans. The cyber-risk domains may include a patching posture of the organization/divisions, which may include information collected from at least one security patching system. The cyber-risk domains may include a policy compliance posture of the organization/divisions, which may include information collected from at least one security policy compliance system.

According to examples, the processor 104 may calculate the scores based on the information collected from a number of data sources 120a-120n, in which the variable "n" may represent a value greater than one. The data sources 120a-120n may be any of the sources of information discussed herein from which the processor 104 may collect data regarding the cyber-risk domains related to the cybersecurity of the organization. Thus, for instance, the data sources 120a may be sources of: data protection information, risk and compliance information, identity management information, security operations information, foundational security information, application security information, internet of things information, cloud security information, and/or the like. The sources of security operations information may include sources of: monitoring and operation information, vulnerability assessment and management information, change management information, orchestration and automation information, incident management and response information, and/or the like. The sources of foundational security information may include sources of: network information, endpoint information, data center information, and/or the like.

In some examples, some or all of the data sources 120a-120n are external to the apparatus 102. In these examples, some or all of the data sources 120a-120n may be applications executed on servers that are external to the apparatus 102. Some or all of the servers may be third party servers and thus may be external to an organization to which the apparatus 102 belongs. In other examples, some or all of the servers on which the data sources 120a-120n are executed or hosted may be owned by the organization that owns the apparatus 102. In still other examples, some or all of the data sources 120a-120n may be applications executing on the apparatus 102. In any of these examples, the data sources 120a-120n may output data related to one or more cyber-risk domains of the cybersecurity of the organization to the apparatus 102. In instances in which the data sources 120a-120n are external to the apparatus 102, the data sources 120a-120n may communicate the data through a network 130, which may be an internal network, a wide area network (such as the Internet), and/or the like.

According to examples, the processor 104 may store the data 112 collected from the data sources 120a-120n in the data store 106 of the apparatus 102. The processor 104 may calculate the scores 114 of the cyber-risk domains related to the cybersecurity of the organization from the data 112, e.g., the cybersecurity related data, stored in the data store 106. The processor 104 may identify the types of data 112, e.g., the data collected from certain ones of the data sources 120a-120n, that are to be used to calculate the scores 114 of the cyber-risk domains. For instance, the processor 104 may identify the data 112 from which of the data sources 120a-120n the processor 104 is to apply in calculating the scores for each of the plurality of cyber-risk domains. The processor 104 may identify the data 112 based on user-defined settings, historical data, through application of machine-learning operations on training data, and/or the like. In some examples, the processor 104 may categorize the data 112 received from the data sources 120a-120n according to the cyber-risk domains in which the data 112 are respectively to be used to calculate the scores 114.

Generally speaking, the processor 104 may apply various formulas or other operations on the data 112 to calculate the scores 114. In some examples, the processor 104 may apply multiple types of formulas on the data 112 pertaining to different cyber-risk domains of the cybersecurity of the organization. The formulas may be user-defined, derived from historical information pertaining to the cyber-risk domains, based on the configurations and types of the data supplied by the data sources 120a-120n, and/or the like. In some examples, the data 112 supplied by the data sources 120a-120n may be in the form of numbers or values and/or the processor 104 may convert the data 112 into numbers or values in instances in which the data 112 is not numbers or values. In any of these examples, the processor 104 may apply the data 112 into the various formulas to calculate the scores 114.

By way of particular example in which the cyber-risk domain is a detection posture of the organization/divisions, the processor 104 may apply a formula on the data 112 collected from one or more of the data sources 120a-120n that track vulnerabilities in the organization's network, computing devices, networking devices, and/or the like. The processor 104 may also apply the formula on the data 112 collected from one or more of the data sources 120a-120n that track endpoint security and one or more of the data sources 120a-120n that track network security. In some instances, the data sources 120a-120n may provide their data in formats that may differ from each other. For instance, one of the data sources 120a-120n may provide their data according to a scale that spans from 0 to 100 and another one of the data sources 120a-120n may provide their data according to a scale that spans from 0 to 10. In such instances, the processor 104 may standardize or normalize the data 112 such that the processor 104 may calculate the score 114 of the detection posture cyber-risk domain using data received from the disparate data sources 120a-120n. For instance, the processor 104 may standardize or normalize the data 112 such that the score 114 from the data 112 corresponding to the detection posture cyber-risk domain is a value between 0 and 10. In other examples, the score 114 may be a value between other lower and upper limits, such as 0 and 20, 0 and 100, etc. The processor 104 may calculate the scores 114 of the other cyber-risk domains in similar manners.

The processor 104 is to execute the instructions 216 to identify a first set of the plurality of cyber-risk domains that are assigned to a first role in the organization. The processor 104 is also to execute the instructions 218 to identify a second set of the plurality of cyber-risk domains that are assigned to a second role in the organization. The processor 104 may also identify additional sets of cyber-risk domains that are assigned to other roles in the organization. The roles in the organization may be roles that may enable entities assigned the roles to have control or to manage cybersecurity issues in the organization. For instance, the first role and the second role may be any of an executive level role, such as chief executive officer (CEO), chief information security officer (CISO), chief information officer (CIO), a director, and/or the like. In some examples, the first role and the second role may be assigned to respective entities or users 140a-140m, in which the variable "m" may represent a value greater than one.

The cyber-risk domains that are assigned to the various roles in the organization may be user-defined and the correlations 116 between the cyber-risk domains and the various roles may be stored in the data store 106. In addition, the processor 104 may identify the sets of cyber-risk domains assigned to the first role and the second role from the correlations 116 stored in the data store 106. In some examples, the correlation 116 between the cyber-risk domains and the first role may differ from the correlation 116 between the cyber-risk domains and the second role such that the roles may be assigned with different cyber-risk domains related to the cybersecurity of the organization.

The processor 104 is to execute the instructions 220 to generate a first dashboard 118a to include the first set of the plurality of cyber-risk domains and the calculated scores 114 of the first set of the plurality of cyber-risk domains. The processor 104 is to execute the instructions 222 to generate a second dashboard 118b to include the second set of the plurality of cyber-risk domains and the calculated scores 114 of the second set of the plurality of cyber-risk domains.

According to examples, the processor 104 is to identify the cyber-risk domains and scores that respectively correspond to a plurality of divisions within the organization. The plurality of divisions may be various departments, various geographically located offices, various business units, or the like, of the organization. In these examples, the processor 104 may generate the first dashboard 118a, the second dashboard 118b, and any additional dashboards 118c-118m to identify the divisions. In some examples, the divisions identified in the dashboards 118a-118m may be defined by a user, may include all of the divisions in the organization, may include selected ones of the divisions in the organization, or the like. As the dashboards 118a-118m include cyber-risk domains and scores corresponding to the plurality of divisions of the organization, the dashboards 118a-118m may provide recipients of the dashboards 118a-118m with comprehensive and simultaneous monitoring of cybersecurity issues associated with the plurality of divisions of the organization. This may also enable comprehensive determinations as to whether the plurality of divisions are in compliance with various regulations.

The processor 104 is to execute the instructions 224 to output the first dashboard 118a and the second dashboard 118b. The processor 104 is to output the dashboards 118a-118m to the network 130 through a network interface 108, which may be hardware and/or software that may facilitate communications through the network 130. In one regard, recipients of the first dashboard 118a and the second dashboard 118b may monitor and remediate cybersecurity issues in the organization based on the information provided in the dashboards 118a, 118b.

Particularly, the processor 104 is to output the first dashboard 118a to a first entity device 142a of the first entity 140a and to output the second dashboard 118b to a second entity device 142b of the second entity 140b. The processor 104 is to also output additional dashboards 118m to other entity devices 142m of other entities 140m. The entity devices 142a-142m may be computing devices owned and/or assigned to the entities 140a-140m, such as laptop computers, smartphones, desktop computers, tablet computers, and/or the like. In any regard, the processor 104 may output the dashboards 118a-118m in any of a number of formats, such as via email communications, text messages, through an application portal, and/or the like.

According to examples, the processor 104 is to execute the instructions 210-224 to enable real-time or near real-time monitoring of cybersecurity issues associated with the organization. In other words, the processor 104 may execute the instructions 210-224 to continuously update or to update the dashboards 118a-118m at certain intervals of time such that the dashboards 118a-118m may display current cybersecurity postures of the various cyber-risk domains. For instance, the processor 104 may execute the instructions 210-224 each time new data is received, at set intervals of time, when an update in the data is received, and/or the like.

Figure 3A:
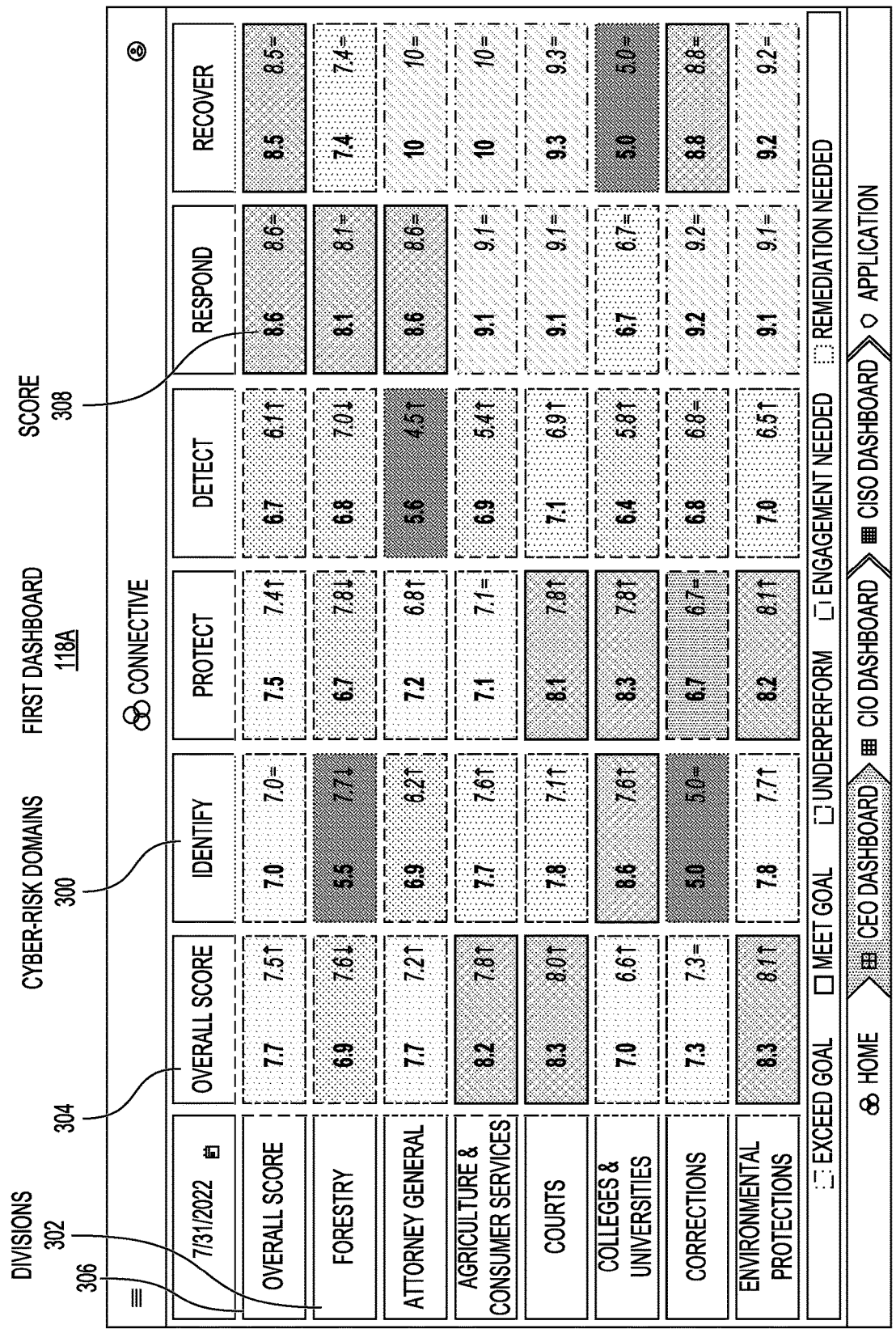
Figure 3C:
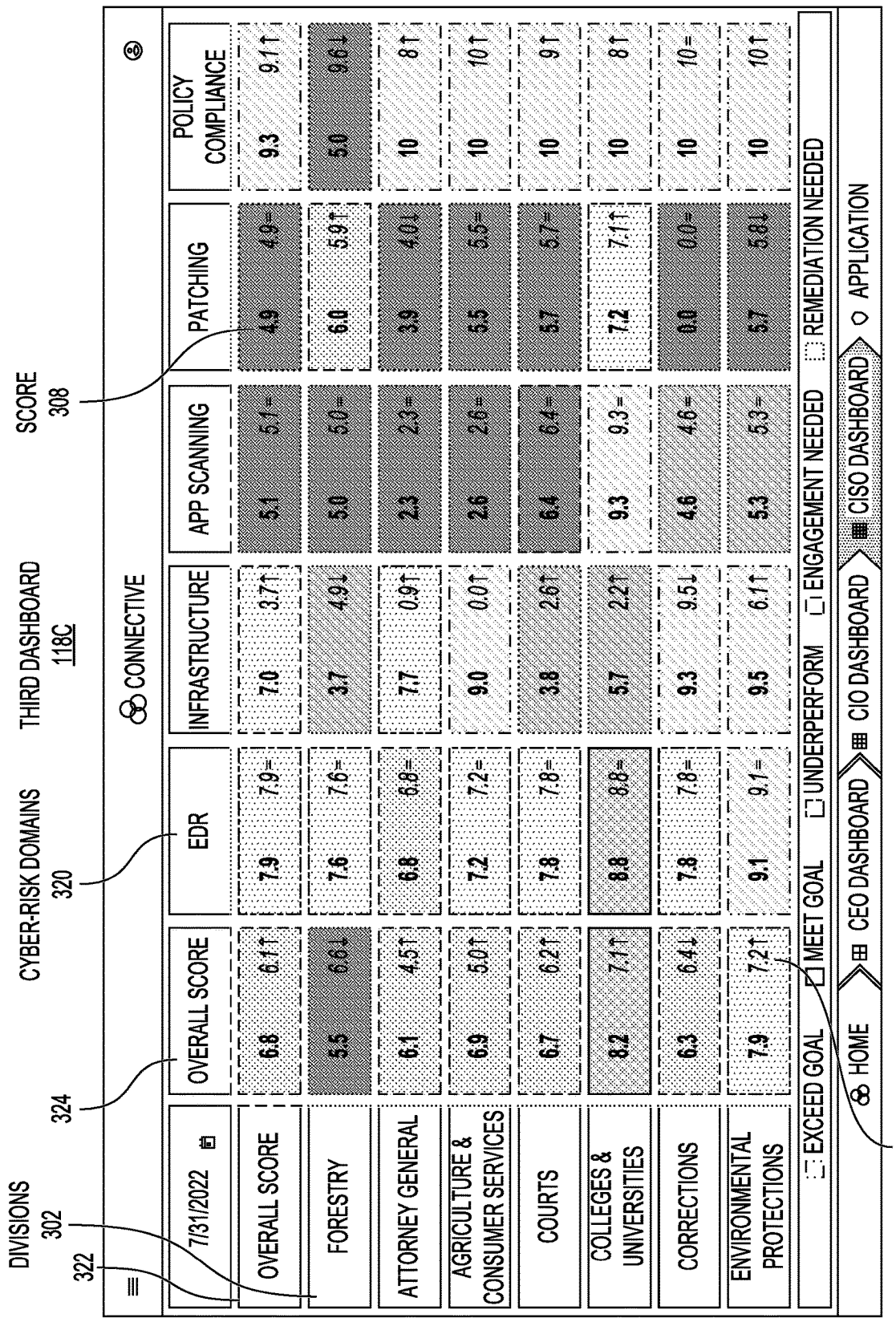

Examples of dashboards 118a-118c are respectively shown in FIGS. 3A-3C, in accordance with embodiments of the present disclosure. It should be clearly understood that the features depicted in FIGS. 3A-3C are for illustration purposes and should not be construed as limiting the present disclosure to the features depicted in those figures.

With reference first to FIG. 3A, there is shown a diagram of a first dashboard 118a, which may be generated for a first entity 140a who has a first role within an organization. The first role may be a relatively high position within the organization, such as a position that affords the entity 140a assigned the first role with the authority to make and implement high level decisions within the organization. The first role may be a CEO, a CISO, a CIO, or the like of the organization. In this regard, the first dashboard 118a may provide a holistic view of the health of the organization tailored to specific job functionalities and needs with increasing levels of informational granularity as appropriate for each role.

The first dashboard 118a is depicted as including a plurality of cyber-risk domains 300 that are assigned to the first role within the organization. In the non-limiting example shown in FIG. 3A, the cyber-risk domains 300 include a identify cyber-risk domain, a protect cyber-risk domain, a detect cyber-risk domain, a respond cyber-risk domain, and a recover cyber-risk domain. In one regard, the cyber-risk domains 300 included in the first dashboard 118a may provide a relatively high level view of the cybersecurity posture of the organization. The cyber-risk domains 300 depicted in the first dashboard 118a correspond to the five National Institute of Standards and Technology (NIST) cybersecurity core functions.

The processor 104 may determine the scores 308 for the identify cyber-risk domain by examining data from asset/patch management, vulnerability assessment, End-point Detection and Response (EDR) tools, IPS, patch management tools, and other telemetries, and comparing that data to assets that are missing patches and/or out in violation of patching policies. The identify cyber-risk domain provides an understanding of potential cybersecurity risks associated with existing assets in the enterprise operating environment. In some examples, the processor 104 may apply a predetermined weighting factor on the data collected from the data sources. By way of particular example, the processor 104 may calculate the scores 308 for the identify cyber-risk domain through use of the following formula:

AVERAGE(IF((100−(WeightFactor1*Param1/Param2))/10>0,(100 WeighFactor1*Param1/Param2))/10,0),IF(10 WeightFactor4*(Param3+Param4)>0,10−WeightFactor4*(Param3+Param4),0))

Where:
WeightFactor1=500;
WeightFactor4=3;
Param1=Number of missing cyber assets from the patching system;
Param2=Number of cyber assets managed by the patching system;
Param3=Cyber Vulnerability Density present in internet exposed cyber assets; and
Param4=Cyber Vulnerability Density present in non-internet (internal) exposed cyber assets.

The processor 104 may determine the scores 308 for the protect cyber-risk domain by using information from tools such as scanners, EDR, identity management, endpoint, IPS, patch management tools, and/or network detection technologies and comparing that data to assets that are infected (IPS), and/or missing from patching systems, and/or are in violation of patching polices. The protect cyber-risk domain scores 308 may provide information regarding how well the procedures and practices of each unit of the enterprise are protecting the organization from cyber risks. In some examples, the processor 104 may apply a predetermined weighting factor on the data collected from the data sources in calculating the scores 308. By way of particular example, the processor 104 may calculate the scores 308 for the protect cyber-risk domain through use of the following formula:

(AVERAGE(IF((100−(WeightFactor1*Param1/Param2))/10>0,(1004 WeightFactor1*Param1/Param2))/10,0),IF(10−WeightFactor4*(Param1+Param2)>0,10−WeightFactor4*(Param3+Param4),0),IF((100−(WeightFactor2*Param5/Param6))/10>0,(100−(WeightFactor2*Param5/Param6))/10,0),IF(Param7/WeightFactor3*10>0,Param7/WeightFactor3*10,0)))

Where:
WeightFactor1=500;
WeightFactor2=5000;
WeightFactor3=850;
WeightFactor4=3;
Param1=Number of missing cyber assets from the patching system;
Param2=Number of cyber assets managed by the patching system;
Param3=Cyber Vulnerability Density present in internet exposed cyber assets;
Param4=Cyber Vulnerability Density present in non-internet (internal) exposed cyber assets;
Param5=Cyber Assets infections detected;
Param6=Number of Cyber Assets managed by infection event detection system; and
Param7=Overall cyber security score derived from public traffic monitoring system.

The processor 104 may determine the scores 308 for the detect cyber-risk domain scores from a total number of assets identified by examining data from scanners, EDR, IPS, detective controls such as security continuous monitoring tools, intrusion detection mechanisms, patch management tools, etc., and comparing that data to those assets that are detected via IPS and EDR, as well as those that are infected. The detect cyber-risk domain is to provide an understanding of how well enterprise units are able to detect cybersecurity risks that arise from anomalies detected in hosts or a network. In some examples, the processor 104 may apply a predetermined weighting factor on the data collected from the data sources in calculating the scores 308. By way of particular example, the processor 104 may calculate the scores 308 for the detect cyber-risk domain through use of the following formula:

$$AVERAGE((IF(((10-WeightFactor4*Param1)+(10-WeightFactor4*Param2))/2>0,((10-WeightFactor4*Param1)+(10-WeightFactor4*Param2))/2,0)),IF((100-(WeightFactor2*Param6/Param7))/10>0,(1004 WeightFactor2*Param6/Param7))/10,0),IF((100-(WeightFactor2*Param8/Param9))/10>0,(100-(WeightFactor2*Param8/Param9))/10,0))$$

Where:
Param1=Cyber Vulnerability Density for infrastructure of the organization/division;
Param2=Cyber Vulnerability Density for web applications of the organization/division;
WeightFactor2=5000;
WeightFactor4=3;
Param6=Number of Cyber Assets managed by infection event detection system;
Param7=Overall cyber security score derived from public traffic monitoring system;
Param8=Number of Malicious network events detected by network event detection system; and
Param9=Number of Total network events detected by network event detection system.

The processor 104 may determine the respond cyber-risk domain scores 308 from data sources that provide information on how appropriate actions are triggered in response to security events. For instance, the processor 104 may determine the respond cyber-risk domain scores 308 based on the total number of tickets and their root cause analysis (RCA), compared to the number that are resolved or completed. The respond cyber-risk domain provides visibility into the number of events or tickets that have been addressed as well as how response planning is conducted, etc. In some examples, the processor 104 may apply a predetermined weighting factor on the data collected from the data sources in calculating the scores 308. By way of particular example, the processor 104 may calculate the scores 308 for the respond cyber-risk domain through use of the following formula:

$$AVERAGE(Param1/Param2,Param3/Param4)*10;$$

Where:
Param1=Number of resolved cyber security tickets of the organization/division;
Param2=Number of total cyber security tickets of the organization/division;
Param3=Number of completed cyber security actions from cyber-RCA projects of the organization/division; and
Param4=Number of total cyber security actions from cyber-RCA projects of the organization/division.

The processor 104 may determine the recover cyber-risk domain scores 308 from data sources that provide indicators such as root cause analysis (RCA), uptime, etc. For instance, the processor 104 may determine the recover cyber-risk domain scores 308 based on the number of calculated RCA tickets compared to the number opened. The recover cyber-risk domain is to provide an understanding of the processes and actions taken across the enterprise to recover from incidents. In some examples, the processor 104 may apply a predetermined weighting factor on the data collected from the data sources in calculating the scores 308. By way of particular example, the processor 104 may calculate the scores 308 for the recover cyber-risk domain through use of the following formula:

$$Param3/Param4*10;$$

Where:
Param3=Number of completed cyber security actions from cyber-RCA projects of the organization/division; and
Param4=Number of total cyber security actions from cyber-RCA projects of the organization/division.

The first dashboard 118a also includes a plurality of divisions 302 of the organization. In addition, for each of the divisions 302, the first dashboard 118a displays scores 308 corresponding to the cyber-risk domains 300. In some examples, the processor 104 may identify the cyber-risk domains 300 and the scores 308 that respectively correspond to the divisions 302 and may generate the first dashboard 118a to include the identified cyber-risk domains 300 and scores 308 corresponding to the divisions 302.

The first dashboard 118a also displays an overall score 304 of the scores identified in the first dashboard 118a and overall scores 306 of each of the divisions 302. The processor 104 may calculate the overall scores 304 and 306 in each of the rows are calculated by averaging the scores 308 in the corresponding column for each division 302. Although the first dashboard 118a has been depicted as including certain cyber-risk domains 300 and divisions 302, it should be clearly understood that the cyber-risk domains 300, divisions 302, and scores 308 depicted in FIG. 3A are not intended to limit the present disclosure in any respect.

According to examples, the processor 104 may calculate the overall scores 304, 306 by calculating the arithmetic averages of the scores 308 in the rows. In other examples, the processor 104 may apply weighting factors to the scores 308, in which the weighting factors may be based on any number of various factors. In addition, the weighting factors may be customized to an organization-customized algorithm that expresses the weighing factor for each row. The weighting factors may be based on relative cyber security risks of a given organization's division to the overall cybersecurity risk of the organization. For example, in the first dashboard 118a, the "Attorney General" division 302 may have been given a weighting factor of 3, the "Courts" division 302 may have been given a weighting factor of 2, and the other divisions 302 may have been given a standard weighting factor of "1."

In addition, the processor 104 may apply greater weighting factors to certain cyber-risk domains when calculating the averages across the cyber-risk domains. The weighting factors may be user defined, based on historical data, based on artificial intelligence processing of data, etc. By way of example, assigning a weighting factor of 2 to the identify cyber-risk domain, 3 to the protect cyber-risk domain, 3 to the detect cyber-risk domain, and 1 to both the respond and recover cyber-risk domains will give higher focus to the organization to preventative and detection measures than recovery measures.

According to examples, the weighting factors are determined based on the organization's needs, as well as objectives for the organization, such as when regulatory compliance is the main priority, then the defaults (all weighting factors of 1) may be used. However, when the main priority is preventing cybersecurity hacks, then a proprietary weighting algorithm may be used to prioritize the prevention of cybersecurity hacks for the organization.

With reference now to FIG. 3B, there is shown a diagram of a second dashboard 118b, which may be generated for a second entity 140b who has a second role within the organization. The second role may be also be a relatively high position within the organization, such as a position that affords the entity 140a assigned the first role with the authority to make and implement high level decisions within the organization. The second role may be a role that is below the first role, such as a CISO, a CIO, or the like of the organization. The second dashboard 118b may provide a view of the organization (or the divisions 302, or units, or geographies) exactly as the first dashboard 118a, but examines performance using more refined details and provides a different packaging or curation of the same controls. Both of the first and second dashboards 118a, 118b may be generated based on the consolidation of the raw data gathered from multiple telemetry sources. The data presented here provides a deeper visibility into the operating environment, specific exposures, and threats, as well as into the overall health of the network and security posture of the organization.

The second dashboard 118b is depicted as including a plurality of cyber-risk domains 310 that are assigned to the second role within the organization. In the non-limiting example shown in FIG. 3B, the cyber-risk domains 310 include a threat level cyber-risk domain, a vulnerability exposure cyber-risk domain, an endpoint health cyber-risk domain, a network health cyber-risk domain, and a public posture cyber-risk domain. The cyber-risk domains 310 depicted in the second dashboard 118b may be directed to more focused cybersecurity issues than the cyber-risk domains 300 depicted in the first dashboard 118a.

The threat level cyber-risk domain scores 308 may provide an understanding of cybersecurity risks associated with changes in malicious activities. The processor 104 may gather data from detective controls such as EDR, intrusion detection systems (IDSs), intrusion prevention systems (IPSs), etc. The processor 104 may calculate the threat level cyber-risk domain scores 308 based on the total number of assets identified by EDR and IPS systems versus those that are infected or malicious. The processor 104 may also calculate the threat level cyber-risk domain scores 308 using a predetermined weighting factor. By way of example, the processor 104 may calculate the threat level cyber-risk domain scores 308 through use of the following formula:

$$IF((((100-(5000*Param1/Param2))/10)+((100-(WeightFactor2*Param3/Param4))/10))/2>0,\\(((100-(WeightFactor2*Param1/Param2))/10)+\\((100-(WeightFactor2*Param3/Param4))/10))/2,\\0);$$

Where:
WeightFactor2=5000;
Param1=Number of Threats detected in Cyber Assets managed by endpoint threat detection system;
Param2=Number of Cyber Assets managed by endpoint threat detection system;
Param3=Number of Malicious network events detected by network event detection system; and
Param4=Number of Total network events detected by network event detection system.

The vulnerability exposure cyber-risk domain scores 308 may provide an understanding of cybersecurity risks associated with vulnerabilities in the operating environment. The vulnerability exposure cyber-risk domain scores 308 synthesizes data from vulnerability scanners, as well as assets discovered using other telemetry data. The processor 104 may calculate the vulnerability exposure cyber-risk domain scores 308 based on the total number of assets identified by both infrastructure and application versus those that have assets that have vulnerability. The processor 104 may also calculate the vulnerability exposure cyber-risk domain scores 308 using a predetermined weighting factor. By way of example, the processor 104 may calculate the vulnerability exposure cyber-risk domain scores 308 through use of the following formula:

$$IF(((10-WeightFactor4*Param1)+(10-\\WeightFactor4*Param2))/2>0,((10-\\WeightFactor4*Param1)+(10-\\WeightFactor4*Param2))/2,0);$$

Where:
WeightFactor4=3;
Param1=Cyber Vulnerability Density for infrastructure of the organization/division; and
Param2=Cyber Vulnerability Density for web applications of the organization/division.

The endpoint health cyber-risk domain scores 308 may provide an understanding of cybersecurity risks rising from anomalies detected in host detective controls, such as security continuous monitoring tools, EDR, host intrusion detection mechanisms, etc. The processor 104 may calculate the endpoint health cyber-risk domain scores 308 based on the total number of assets identified EDR systems versus those that are infected. The processor 104 may also calculate the endpoint health cyber-risk domain scores 308 using a predetermined weighting factor. By way of example, the processor 104 may calculate the endpoint health exposure cyber-risk domain scores 308 through use of the following formula:

$$IF((100-(WeightFactor2*Param1/Param2))/10>0,\\(1004\ WeightFactor2*Param1/Param2))/10,0);$$

Where:
WeightFactor2=5000;
Param1=Number of Threats detected in Cyber Assets managed by endpoint threat detection system; and Param2=Number of Cyber Assets managed by endpoint threat detection system.

The network health cyber-risk domain scores 308 may provide an understanding of cybersecurity risks that stem from anomalies detected in network detective controls such as security network devices, network intrusion detection mechanism, etc. The processor 104 may calculate the network health cyber-risk domain scores 308 based on the total number of assets identified IPS systems versus those that are detected malicious events. The processor 104 may also calculate the network health cyber-risk domain scores 308 using a predetermined weighting factor. By way of example, the processor 104 may calculate the network health cyber-risk domain scores 308 through use of the following formula:

$$IF((100-(WeightFactor2*Param1/Param2))/10>0,\\(1004\ WeightFactor2*Param1/Param2))/10,0);$$

Where:
WeightFactor2=5000;
Param1=Number of Malicious network events detected by network event detection system; and
Param2=Number of Total network events detected by network event detection system.

The public posture cyber-risk domain scores 308 may provide an understanding of cybersecurity risks rising from the external security posture gathered from publicly available information. The processor 104 may leverage technologies such as cybersecurity rating companies in calculating the public posture cyber-risk domain scores 308. The processor 104 may also calculate the public posture cyber-risk domain scores 308 using a predetermined weighting factor. By way of example, the processor 104 may calculate the public posture cyber-risk domain scores 308 through use of the following formula:

$$IF(Param1/WeightFactor3*10>0,Param1/WeightFactor3*10,0);$$

Where:
WeightFactor3=850; and
Param1=Overall cyber security score derived from public traffic monitoring system.

The second dashboard 118b includes the plurality of divisions 302 of the organization and displays, for each of the divisions 302, scores 308 corresponding to the cyber-risk domains 310. In some examples, the processor 104 may identify the cyber-risk domains 310 and the scores 308 that respectively correspond to the divisions 302 and may generate the second dashboard 118b to include the identified cyber-risk domains 310 and scores 308 corresponding to the divisions 302.

The second dashboard 118b further displays an overall score 312 of the scores 308 identified in the second dashboard 118b and overall scores 314 of each of the divisions 302. The processor 104 may calculate the overall scores 312, 314 by averaging the scores 308 in the corresponding columns for each of the cyber-risk domains 310. Although the second dashboard 118b has been depicted as including certain cyber-risk domains 310 and divisions 302, it should be clearly understood that the cyber-risk domains 310, divisions 302, and scores 308 depicted in FIG. 3B are not intended to limit the present disclosure in any respect.

Reference is now made to FIG. 3C, which shows a diagram of a third dashboard 118c, which may be generated for a third entity 140c who has a third role within the organization. The third role may be a role that is lower in the organization than the first role and the second role, such as an information technology (IT) director, IT manager, or the like of the organization. In some examples, some or all of the entities 140a-140m may have access to each of the dashboards 118a-118m. In these examples, the entities 140a-140m may select the dashboard 118a-118m that they would like to view.

The third dashboard 118c is depicted as including a plurality of cyber-risk domains 320 that are assigned to the third role within the organization. The third dashboard 118c may provide a view of the organization (or the enterprise divisions 302, or units, or geographies) exactly as the first and second dashboards 118a, 118b but goes further and provides more refined data than either of those dashboards 118am 118b. The third dashboard 118c presents the consolidation of raw information gathered from different tools within a given environment providing a good view of operational status based on each of the technology categories. The CISO, for instance, may need to know that all tools and assets and processes in the security posture are performing as expected to ensure the overall security of the enterprise. The views in the third dashboard 118c may thus be more technical than the view in the first and second dashboards 118a, 118b. The number of columns is configurable.

In the non-limiting example shown in FIG. 3C, the cyber-risk domains 320 include an endpoint detection and response (EDR) cyber-risk domain, an infrastructure cyber-risk domain, an application scanning cyber-risk domain, a patching cyber-risk domain, and a policy compliance cyber-risk domain. The cyber-risk domains 320 depicted in the third dashboard 118c may be directed to more focused cybersecurity issues than the cyber-risk domains 300 and 310 depicted in the first dashboard 118a and the second dashboard 118b. In other words, the cyber-risk domains 320 in the third dashboard 118c may be of more relevance to an entity 140c having the third role in the organization.

The EDR cyber-risk domain scores 308 may represent a consolidation of indicators from all endpoint detection and response tools. The processor 104 may calculate the EDR cyber-risk domain scores 308 based on the total number of assets identified by EDR versus those that are infected or malicious. The processor 104 may also calculate the EDR cyber-risk domain scores 308 using a predetermined weighting factor. By way of example, the processor 104 may calculate the EDR cyber-risk domain scores 308 using the following formula:

$$IF((100-(WeightFactor2*Param1/Param2))/10>0,\\(1004\ WeightFactor2*Param1/Param2))/10,0);$$

Where:
WeightFactor2=5000;
Param1=Number of Threats detected in Cyber Assets managed by endpoint threat detection system; and
Param2=Number of Cyber Assets managed by endpoint threat detection system.

The infrastructure cyber-risk domain scores 308 may represent a consolidation of indicators from all infrastructure scanning tools, such as vulnerability scanners. The processor 104 may calculate the infrastructure cyber-risk domain scores 308 based on the total number of assets identified by vulnerability scanners versus those that have assets that have vulnerability. The processor 104 may also calculate the infrastructure cyber-risk domain scores 308 using a predetermined weighting factor. By way of example, the processor 104 may calculate the infrastructure cyber-risk domain scores 308 using the following formula:

$$IF(10-WeightFactor4*Param1>0,10-\\WeightFactor4*Param1,0);$$

Where:

WeightFactor4=3; and

Param1=Cyber Vulnerability Density for infrastructure of the organization/division.

The application scanning cyber-risk domain scores 308 may represent a consolidation of indicators from the scanning of all external facing applications. The application scanning cyber-risk domain scores 308 may unify the reporting from multiple application vulnerability scanning tools. The processor 104 may calculate the application scanning cyber-risk domain scores 308 based on the total number of assets identified by vulnerability scanners versus assets that exhibit the vulnerability. The processor 104 may also calculate the application scanning cyber-risk domain scores 308 using a predetermined weighting factor. By way of example, the processor 104 may calculate the application scanning cyber-risk domain scores 308 using the following formula:

IF(10−WeightFactor4*Param1>0,10−
WeightFactor4*Param1,0);

Where:

WeightFactor4=3; and

Param1=Cyber Vulnerability Density for Web Application of the organization/division.

The patching cyber-risk domain scores 308 may represent a consolidation of indicators based on progress and status reports from patch management tools. The processor 104 may calculate the patching cyber-risk domain scores 308 based on the total number of assets identified by patching systems versus those that are missing patches. The processor 104 may also calculate the patching cyber-risk domain scores 308 using a predetermined weighting factor. By way of example, the processor 104 may calculate the patching cyber-risk domain scores 308 using the following formula:

IF((100−(WeightFactor1*Param1/Param2))/10>0,
(1004 WeightFactor1*Param1/Param2))/10,0);

Where:

WeightFactor1=500;

Param1=Number of missing cyber assets from the patching system; and

Param2=Number of cyber assets managed by the patching system.

The policy compliance cyber-risk domain scores 308 may provide an overview of policy compliance based on internal policies. The processor 104 may calculate the policy compliance cyber-risk domain scores 308 based on the number of out-of-compliance assets checked against internal policies. The processor 104 may also calculate the policy compliance cyber-risk domain scores 308 using a predetermined weighting factor. By way of example, the processor 104 may calculate the patching cyber-risk domain scores 308 using the following formula:

IF(10−WeightFactor4*(Param1+Param2)>0,10−
WeightFactor4*(Param1+Param2),0);

Where:

WeightFactor4=3;

Param1=Cyber Vulnerability Density out of compliance for infrastructure of the organization/division; and Param2=Cyber Vulnerability Density in-compliance for infrastructure of the organization/division.

The third dashboard 118c is depicted as including the plurality of divisions 302 of the organization and, for each of the divisions 302, a score corresponding to the cyber-risk domains 320. In some examples, the processor 104 may identify the cyber-risk domains 320 and the scores 308 that respectively correspond to the divisions 302 and may generate the third dashboard 118c to include the identified cyber-risk domains 320 and scores 308 corresponding to the divisions 302.

The third dashboard 118c further displays an overall score 322 of the scores identified in the third dashboard 118c and overall scores 324 of each of the divisions 302. The processor 104 may calculate the overall scores 322, 324 by averaging the scores 308 in the corresponding columns for each of the cyber-risk domains 320. Although the third dashboard 118c has been depicted as including certain cyber-risk domains 320 and divisions 302, it should be clearly understood that the cyber-risk domains 310, divisions 302, and scores 308 depicted in FIG. 3C are not intended to limit the present disclosure in any respect.

According to examples and as shown in FIGS. 3A-3C, the scores 308 may represent severity levels of the cyber-risk domains 300, 310, 320. For instance, the scores 308 may range from 0 to 10, in which "0" represents the highest severity value and "10" may represent a lowest severity value. In other words, "0" may indicate that the severity of a risk associated with a certain cyber-risk domain 300, 310, 320 is the highest and "10 may represent that the severity of a risk associated with a certain cyber-risk domain 300, 310, 320 is the lowest. Thus, for instance, scores 308 that are closer to "0" or other certain threshold may be construed as posing the greatest severity level or greatest risk while scores 308 that are closer to "10" or other certain threshold may be construed as posing the least severity level or least risk. In other examples, however, the processor 104 may use "0" to represent the highest severity level and "10" as the lowest severity level.

In some examples, the processor 104 may analyze the scores 308 to determine the severity levels of the first set of the cyber-risk domains 300, the second set of the cyber-risk domains 310, the third set of the cyber-risk domains 320, and so forth, based on the calculated scores of the cyber-risk domains 300, 310, 320. In addition, the processor 104 may generate the dashboards 118a-118c to graphically depict the determined severity levels of the cyber-risk domains 300, 310, 320. The graphical depictions may be any graphical way of showing the severity levels of the cyber-risk domains 300, 310, 320 based on the scores 308. For instance, the graphical depictions may include displaying the scores 308 and/or cells within which the scores 308 are displayed with different properties based on whether the scores fall on, below, or over certain thresholds. The certain properties may be colors, shadings, sizes of displayed scores 308, sizes and/or shapes of the cells within which the scores 308 are displayed, and/or the like.

By way of particular example, the processor 104 may display scores 308 that are below a first threshold, e.g., 5.9 or below, with a first color, e.g., a red color, which may indicate that the cyber-risk domain 300, 310, 320 corresponding to a division 302 may require remediation. The processor 104 may display scores 308 that range between the first threshold and a second threshold, e.g., between 6.0 and 6.9, with a second color, e.g., an orange color, which may indicate that the cyber-risk domain 300, 310, 320 corresponding to a division 302 may require an engagement. The processor 104 may display scores 308 that range between the second threshold and a third threshold, e.g., between 7.0-7.9, with a third color, e.g., a yellow color, which may indicate that the cyber-risk domain 300, 310, 320 corresponding to a division 302 may be underperforming.

The processor 104 may display scores 308 that range between the third threshold and a fourth threshold, e.g., between 8.0-8.9, with a fourth color, e.g., a blue color, which may indicate that the cyber-risk domain 300, 310, 320 corresponding to a division 302 may be meeting a goal. The processor 104 may display scores 308 that are above the fourth threshold, e.g., 9 or above, with a fifth color, e.g., a green color, which may indicate that the cyber-risk domain 300, 310, 320 corresponding to a division 302 may be exceeding a goal. It should be understood that the thresholds and colors are for illustrative purposes only and that other thresholds and colors may be employed without departing from a scope of the present disclosure. Additionally, it should be understood that the threshold and colors are user-definable and thus, may be personalized for different users.

In some examples, the processor 104 may calculate updated scores 308 of the plurality of cyber-risk domains 300, 310, 320. In addition, the processor 104 may generate updated dashboards 118a-118m to include the updated scores 308 of the plurality of cyber-risk domains 300, 310, 320. For instance, the dashboards 118a-118c may include the updated scores 308. As shown in FIGS. 3A-3C, the processor 104 may, in addition to displaying the updated scores 308, display prior scores 318 in the updated dashboards 118a-118m. In the dashboards 118a-118c, the prior scores 318 are shown as being relatively smaller than the scores 308. The processor 104 may also display an arrow to denote the direction in which the trend of the score 308 is moving, e.g., up for improvements and down for declines.

As may be noted from the examples of the dashboards 118a-118c depicted in FIGS. 3A-3C, the dashboards 118a-118m may provide entities 140a-140m with a relatively large amount of information pertaining to the cybersecurity postures of the organization in which they are associated. In one regard, the entities 140a-140m may be provided with a platform through which the entities 140a-140m may readily identify potential issues with their cybersecurity postures. As a result, the entities 140a-140m may be able to make decisions that may affect the cybersecurity postures in a timely manner, which may reduce the potential harm caused by any such issues. In addition, as the scores 308 are determined through aggregations of data collected from a plurality of data sources 120a-120n, issues that may not be identified through the data collected from one or more of the data sources 120a-120n may be identified.

By way of particular example, a reported data may indicate that a security failure on a multi-factor authentication on a server has been detected. Another reported data may indicate that a password for a user that normally logs into that server has been compromised. In addition, a further reported data may indicate that a vulnerability in the server has been detected. In this example, any one of these issues may not trigger an indication that a potentially harmful event has occurred and thus, for instance, may not trigger an alert for some action to be taken. However, the aggregate of these events may cause a score for one or more of the cyber-risk domains to which these data is are used to calculate the scores to fall below a first threshold value, e.g., cause the score to be flagged for immediate attention, such as by making the score 308 and/or the cell within which the score 308 is included to be displayed with a red or other distinguishing color.

In some examples, the processor 104 may provide the entities 140a-140m with additional information regarding features displayed in the dashboards 118a. In these examples, for instance, the processor 104 may receive a request for additional information regarding a feature displayed in a dashboard 118a, for instance, from the first entity 140a. The first entity 140a may request the additional information by, for instance, selecting a certain cyber-risk domain 300, a certain division 302, a certain score 308, or the like, in the dashboard 118a. In this regard, and in some examples, the elements included in the dashboard 118a may be links to other dashboards or information tables. In other examples, the first entity 140a may submit a request for the additional information in other manners, such as through a search query, through selection of another link, and/or the like.

According to examples, responsive to receipt of a request for the additional information of a certain feature, the processor 104 may access the additional information of the certain feature. The processor 104 may access the additional information from the data 112 stored in the data store 106. In addition, the processor 104 may generate an information table to include the additional information of the certain feature. The processor 104 may generate the information table according to the additional feature that is to be included in the information table. In addition, the processor 104 may output the generated information table to the entity 140a-140m that requested the additional information.

Turning now to FIGS. 4A and 4B, there are shown examples of information tables 400 and 410, in accordance with examples of the present disclosure. It should be clearly understood that the features depicted in FIGS. 4A and 4B are for illustration purposes and should not be construed as limiting the present disclosure to the features depicted in those figures.

With reference first to FIG. 4A, there is shown a diagram of a first information table 400, which the processor 104 may generate responsive to a request for information pertaining to an overview of security vulnerabilities of the divisions 302 in the organization. As shown in FIG. 4A, the information table 400 may include a breakdown of the divisions 302 and various information pertaining to the security vulnerabilities of the divisions 302. For instance, the information table 400 shows, for each of the divisions 302 and for each of a number of cybersecurity vulnerabilities, a number of IPSs, e.g., Ips, iow, Internet Protocol addresses, etc. associated with a certain physical asset belonging to a certain division within the organization. The information table 400 also shows whether the cybersecurity vulnerability is categorized as being exposed to the Internet and/or being exposed internally.

The information table 400 further shows additional information, such as policy exceptions (PE), which may correspond to events in which devices rare allowed to remain connected to a network even though the devices have a known security vulnerability. This may occur because at times, a security vulnerability may not be fixed or patched for valid operational reasons. The information table 400 still further shows whether a cybersecurity vulnerability is "in compliance" (falling within or conforming to a determined set of acceptable parameters) or "out of compliance" based on a maximum time period for the cybersecurity vulnerability to be patched according to organization security policy.

Turning now to FIG. 4B, there is shown a diagram of a second information table 410, which the processor 104 may generate responsive to a request for information pertaining to security vulnerabilities of a certain one of the divisions 302 in the organization. In some examples, the processor 104 may generate the second information table 410 responsive to a request for the additional information included in the second information table 410. The request may be made from one of the dashboards 118a-118m or another information table, such as the first information table 400. As shown in FIG. 4B, the second information table 410 may include additional information that is directed to a particular feature, such as a certain one of the divisions 302.

Figure 5:
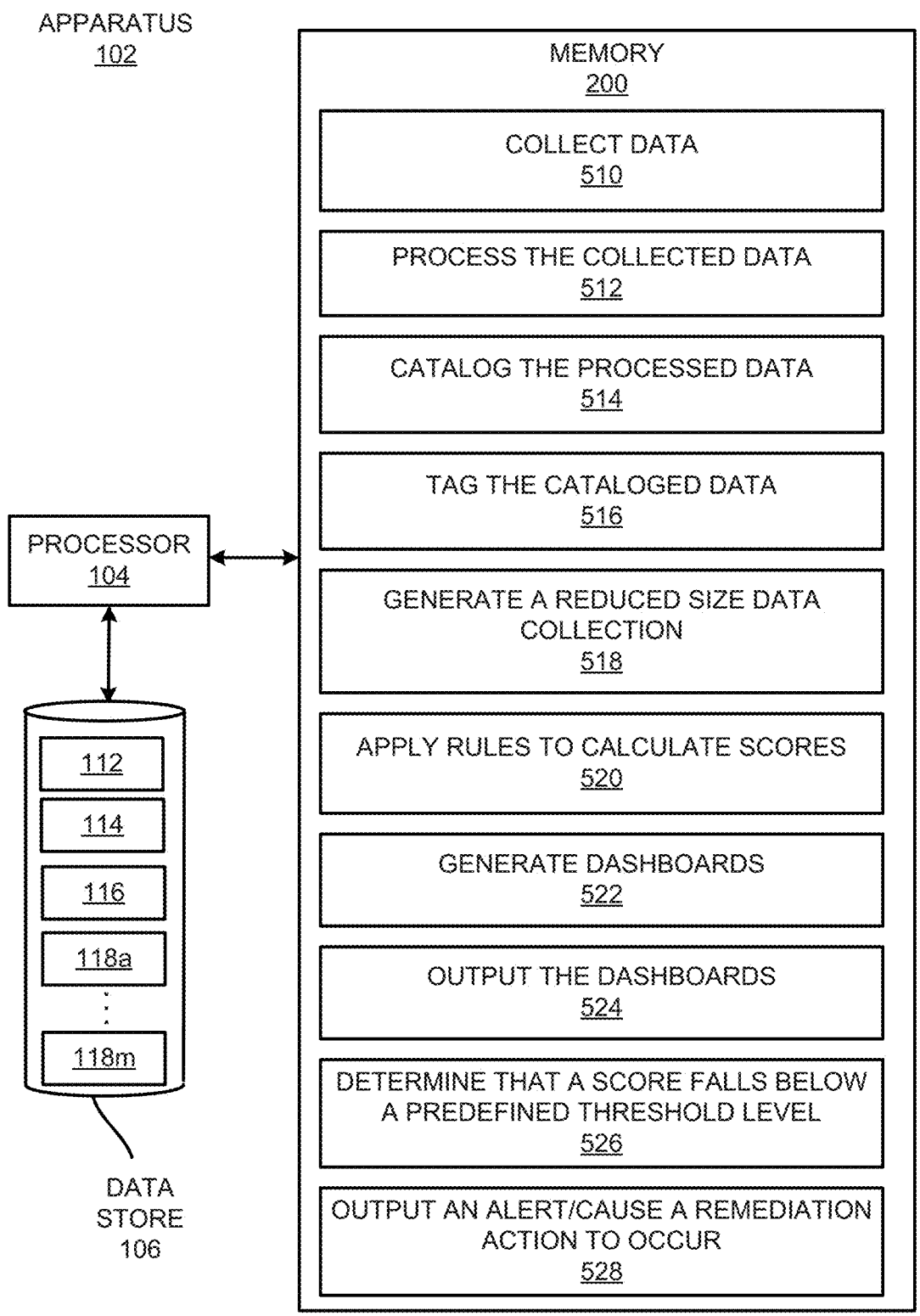
FIG. 5 depicts a block diagram of the apparatus depicted in FIG. 1, in accordance with an embodiment of the present disclosure.

Reference is now made to FIG. 5, which depicts a block diagram of the apparatus 102 depicted in FIG. 1, in accordance with an embodiment of the present disclosure. It should be understood that the apparatus 500, in other examples, includes additional features and that some of the features described herein may be removed and/or modified without departing from the scope of the apparatus 500.

In FIG. 5, the memory 200 is shown as having stored thereon machine-readable instructions 510-528 that the processor 104 is to execute. The memory 200 may store the instructions 510-528 in addition to or in place of one or more of the instructions 210-220 depicted in FIG. 2. The instructions 510-528 may thus be similar to the instructions 210-220.

The processor 104 is to execute the instructions 510 to collect data from multiple data sources 120a-120n. As discussed herein, the data sources 120a-120n may send the data 112, e.g., cybersecurity related data, to the apparatus 102 through the network 130. In addition, or alternatively, the processor 104 may collect some or all of the data 112 through execution of various data source 120a-120n applications.

The processor 104 is to execute the instructions 512 to process the collected data 112 to be interoperable with each other. The processor 104 may process the collected data 112 by normalizing and rationalizing the values in the collected data 112. In many instances, the values in the data 112 may be arranged in multiple scales with respect to each other and thus, the processor 104 may normalize the data 112 by adjusting the values in the data 112 to a notionally common scale, e.g., between 0 and 10. The processor 104 may rationalize the data 112 by describing or interpreting the data 112, for instance, as a precursor to normalizing the data 112 against a standard range. For example, the processor 104 may take the number of vulnerabilities in the organization and may rationalize the number of vulnerabilities to explain whether if the number of vulnerabilities is good or bad. The processor 104 may also convert the number of vulnerabilities to a rating from 0 to 10 when the number of vulnerabilities is an unbounded number (e.g., can take any number from 0 to infinity).

The processor 104 is to execute the instructions 514 to catalog the processed data 112 to the plurality of cyber-risk domains 300, 310, 320. That is, the processor 104 may determine to which of the cyber-risk domains 300, 310, 320 the processed data is relevant, e.g., to be used in calculating the scores 114 of the cyber-risk domains 300, 310, 320. The processor 104 may catalog the processed data 112 into various categories corresponding to their relevance to the cyber-risk domains 300, 310, 320.

In addition, the processor 104 is to execute the instructions 516 to tag the cataloged data with information that the processor 104 may use to readily identify the data 112 that is to be used to calculate the scores 114 of the cyber-risk domains 300, 310, 320. The processor 104 may also catalog and tag the processed data 112 such that the processed data 112 may be used to calculate the scores 114 of the cyber-risk domains 300, 310, 320 for multiple divisions 302.

The processor 104 is to execute the instructions 518 to generate a reduced size data collection, e.g., to reduce a size or number of the collected data 112. Particularly, for instance, the processor 104 may apply summarization and aggregation rules to the collected data 112 to reduce the size of the data. The summarization and aggregation rules may be user-defined, based on historical data, or the like. The processor 104 may summarize the collected data 112 by taking granular, detailed data and presenting the data in a standard format. For instance, the processor 104 may take all of the vulnerabilities that exist in the organization and may summarize the vulnerabilities into a number of vulnerabilities per division 302. The processor 104 may aggregate the collected data 112 by taking all of the vulnerabilities of the organization and aggregating the vulnerabilities into a total per division 302 or a total for the organization.

In some examples, the collected data 112 may be processed, cataloged, and tagged prior to the application of the summarization and aggregation rules on the data 112. In other examples, the collected data 112 may be processed, cataloged, and tagged on the data following the application of the summarization and aggregation rules on the data 112.

The processor 104 is to execute the instructions 520 to calculate the scores for the plurality of cyber-risk domains 300, 310, 320 as discussed herein. In addition, the processor 104 is to execute the instructions 522 to generate dashboards 118a-118m as also discussed herein. Moreover, the processor 104 is to execute the instructions 524 to output the dashboards 118a-118m.

The processor 104 is to execute the instructions 526 to determine that a calculated score 308 falls below a predefined threshold level. For instance, in the example shown in FIG. 3A, the predefined threshold level may be 6.0 and the processor 104 may determine that a score 308 falls below the predefined threshold level of 6.0 or that multiple scores fall below the predefined threshold level.

The processor 104 is to execute the instructions 528 to output an alert responsive to the determination that the score 308 falls below the predefined threshold level. The alert may be any suitable type of notification, such as an email message, a text message, a message communicated over a particular channel, and/or the like. The processor 104 may output the alert to at least one of the entities 140a-140m, and particularly, the entity 140a that is to receive the dashboard 118a that includes the cyber-risk domain 300 having the score 308 that falls below the predefined threshold level.

In addition or alternatively to outputting the alert, the processor 104 is to execute the instructions 528 to cause a remediation action related to the cyber-risk domain 300 corresponding to the calculated score 308 to occur. The remediation action may be, for instance, an action that causes a root of the score 308 to fall below the predefined threshold level to be blocked or remediated. For instance, the remediation action may be an action that causes a vulnerability to be patched, a user to be suspended, and/or the like. The remediation action may take any of a number of different forms from actions that are fast and easy to more complex and time consuming. By way of example, the processor 104 may determine that a control is missing and may lead to the deployment of the security control (for example detecting a missing antivirus software on a system leads to installing of the antivirus software on the system). The remediation action may also be a more complex remediation, such as a low score (identified in red) may lead to the processor 104 creating a project to improve the score, or a low network health score may lead to the processor 104 engaging a network security team to investigate the alert. As another example, a detection of a high number of user clicks on a phishing test may lead to the processor 104 enrolling the users to a cybersecurity awareness training.

Figure 6:
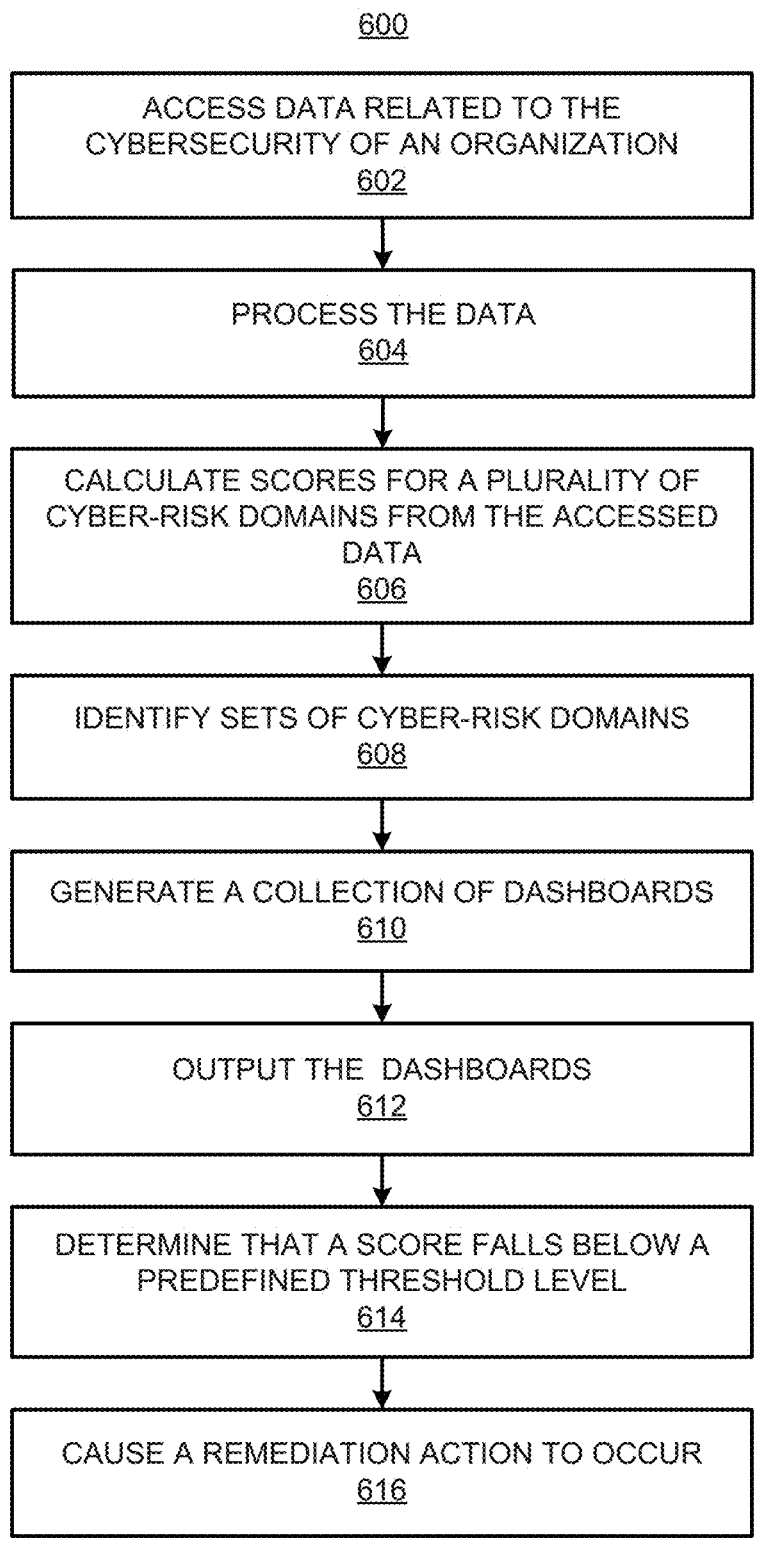
FIG. 6 depicts a flow diagram of a method for monitoring and remediating cybersecurity issues in organizations, in accordance with an embodiment of the present disclosure.
Figure 7:
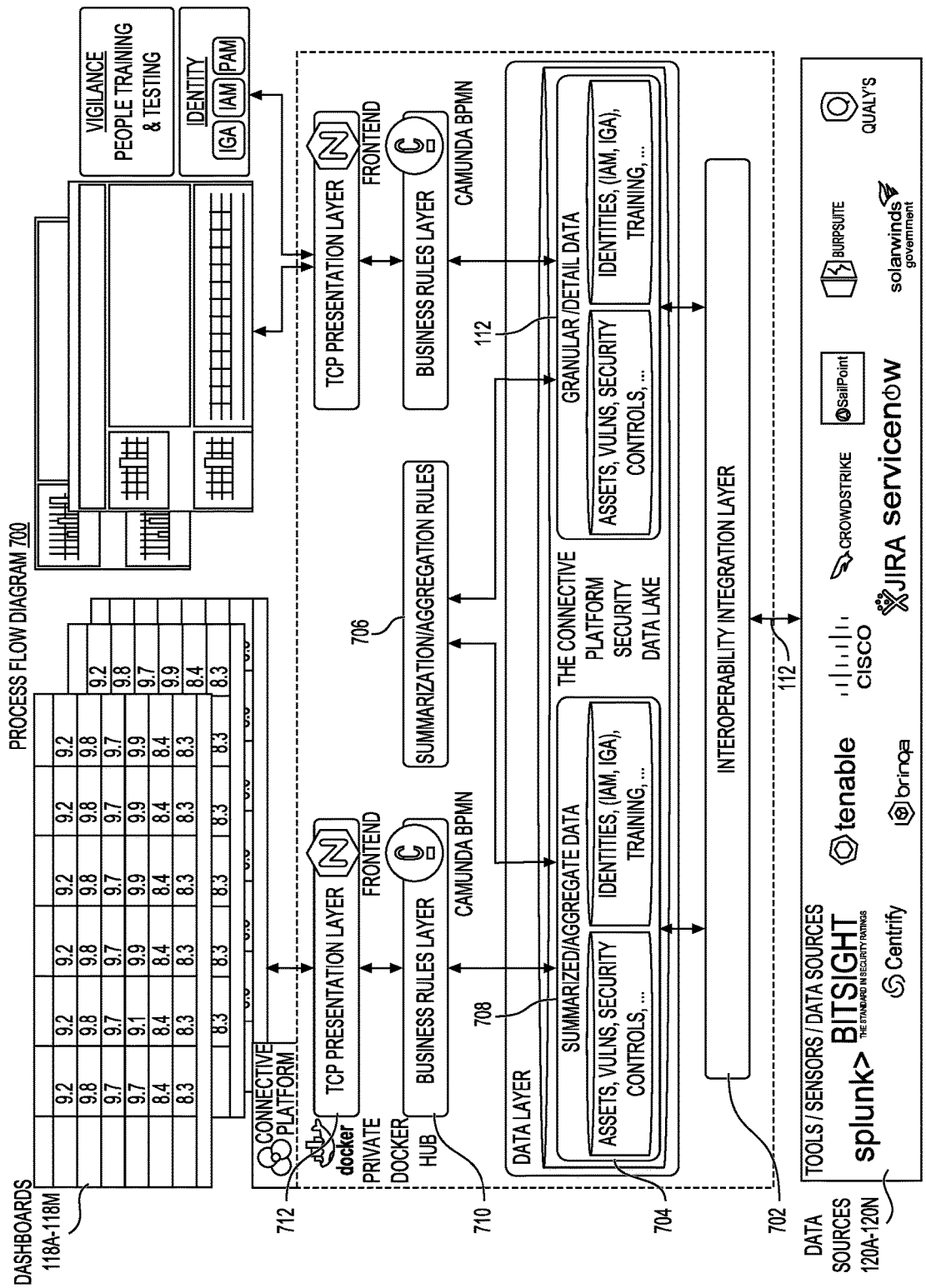
FIG. 7 depicts a process flow diagram corresponding to the operations depicted in FIG. 6, in accordance with an embodiment of the present disclosure.

Reference is now made to FIGS. 6 and 7. FIG. 6 depicts a flow diagram of a method 600 for monitoring and remediating cybersecurity issues in organizations, in accordance with an embodiment of the present disclosure. FIG. 7 depicts a process flow diagram 700 corresponding to the operations depicted in FIG. 6, in accordance with an embodiment of the present disclosure. It should be understood that the method 600 depicted in FIG. 6 and the process flow diagram 700 depicted in FIG. 7 may include additional operations and that some of the operations described therein may be removed and/or modified without departing from the scopes of the method 600 and the process flow diagram 700. The descriptions of the method 600 and the process flow diagram 700 are made with reference to the features depicted in FIGS. 1-3 for purposes of illustration.

With reference first to FIG. 6, at block 602, the processor 104 is to access data 112 related to the cybersecurity of an organization. The processor 104 may access the data 112 from the data sources 120a-120n as shown in FIGS. 1 and 7. In addition, or alternatively, the processor 104 may access the data 112 from the data store 106 as shown in FIGS. 1 and 2. In any of these examples, the processor 104 may process the data 112 in an interoperability integration layer 702. For instance, the processor 104 may process the collected data 112 to be interoperable with each other, catalog the processed data to the plurality of cyber-risk domains, and tag the cataloged data. The processor 104 may process the collected data 112 by normalizing and rationalizing the data 112. The processor 104 may also apply summarization and aggregation rules to the collected data 112 to generate a reduced size data collection.

In any of these examples, the processor 104 may store the collected data 112 in a data layer 704 as shown in FIG. 7. In some examples, the processor 104 may store the collected data 112 and the reduced size data collection 708. As such, for instance, the processor 104 may use the reduced size data collection 708 to calculate the scores and may also use the collected data 112 to determine information at a more granular or detailed level. The processor 104 is shows as applying the summarization/aggregation rules 706 in FIG. 7.

At block 604, the processor may process the accessed data 112 to enable values contained in the accessed data to be interoperable with each other. At block 606, the processor 104 is to calculate scores 114 of a plurality of cyber-risk domains related to the cybersecurity of the organization from the accessed data 112. In some examples, the processor 104 is to calculate the scores 114 based on or otherwise using the tagged data and/or the data in the reduced size data collection 708. As shown in FIG. 7, the processor 104 may apply a business rules layer 710 on the data 112, 708 to calculate the scores. The processor 104 may also apply weighting factors to be applied to the values to generate weighted values and to calculate the scores using the generated weighted values.

At block 608, the processor 104 is to identify a first set of the plurality of cyber-risk domains that are assigned to a first role in the organization. At block 610, the processor 104 is to identify a second set of the plurality of cyber-risk domains that are assigned to a second role in the organization. For instance, the first role and the second role may be any of an executive level role, such as chief executive officer (CEO), chief information security officer (CISO), chief information officer (CIO), a director, and/or the like. The processor 104 may identify the first set of cyber-risk domains and the second set of cyber-risk domains in the business rules layer 710.

At block 612, the processor 104 is to generate a first dashboard 118a that includes the first set of the plurality of cyber-risk domains 300 and the calculated scores 308 of the first set of the plurality of cyber-risk domains 300. An example of the first dashboard 118a is depicted in FIG. 3A and described hereinabove.

At block 614, the processor 104 is to generate a second dashboard 118b that includes the second set of the plurality of cyber-risk domains 310 and the calculated scores 308 of the second set of the plurality of cyber-risk domains 310. An example of the second dashboard 118b is depicted in FIG. 3B and described hereinabove. The processor 104 may generate the first dashboard 118a and the second dashboard 118b in a TCP presentation layer 712.

At block 616, the processor 104 is to output the first dashboard 118a to a first entity 140a that is assigned the first role and the second dashboard 118b to a second entity 140b that is assigned the second role. The processor 104 may output the dashboards 118a, 118b in any of a number of formats, such as via email communications, text messages, through an application portal, and/or the like.

As discussed herein, the organization may include a plurality of divisions 302. In these instances, the processor 104 may identify the cyber-risk domains 300, 310 and scores 308 that respectively correspond to the plurality of divisions 302. The processor 104 may also generate the first dashboard 118a and the second dashboard 118b to include the identified cyber-risk domains 300, 310 and scores 308 corresponding to the plurality of divisions 302.

According to examples, the processor 104 is to access additional data 112 related to the cybersecurity of the organization and to calculate updated scores 308 of the plurality of cyber-risk domains 300, 310 from the additional data. The processor 104 is also to generate an updated first dashboard 118a to include the updated scores 308 and the scores 308 of the first set of the plurality of cyber-risk domains 300. The processor 104 is further to generate an updated second dashboard 118b to include the updated scores 308 and the scores 308 of the second set of the plurality of cyber-risk domains 310. The processor 104 may still further output the updated first dashboard 118a and the updated second dashboard 118b.

According to examples, the processor 104 may receive a request for additional information regarding a feature displayed in the first dashboard. The feature may be a certain cyber-risk domain 300, a certain division 302, a certain score 308, or the like. In addition, the processor 104 may access the additional information regarding the feature from the data 112 and/or the reduced size data collection 708. The processor 104 may generate an information table to include the additional information and may output the information table.

At block 618, the processor 104 is to determine that a calculated score 308 of the calculated scores falls below a predefined threshold level. In addition, at block 620, the processor 104 is to cause a remediation action related to the cyber-risk domain corresponding to the calculated score to occur. For instance, the processor 104 may send an instruction or message to one or more of the data sources 120a-120n to take a remediation action. In other examples, the processor 104 may perform a remediation action on its own.

Some or all of the operations set forth in the method 600 may be included as utilities, programs, or subprograms, in any desired computer accessible medium. In addition, the method 600 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 8:
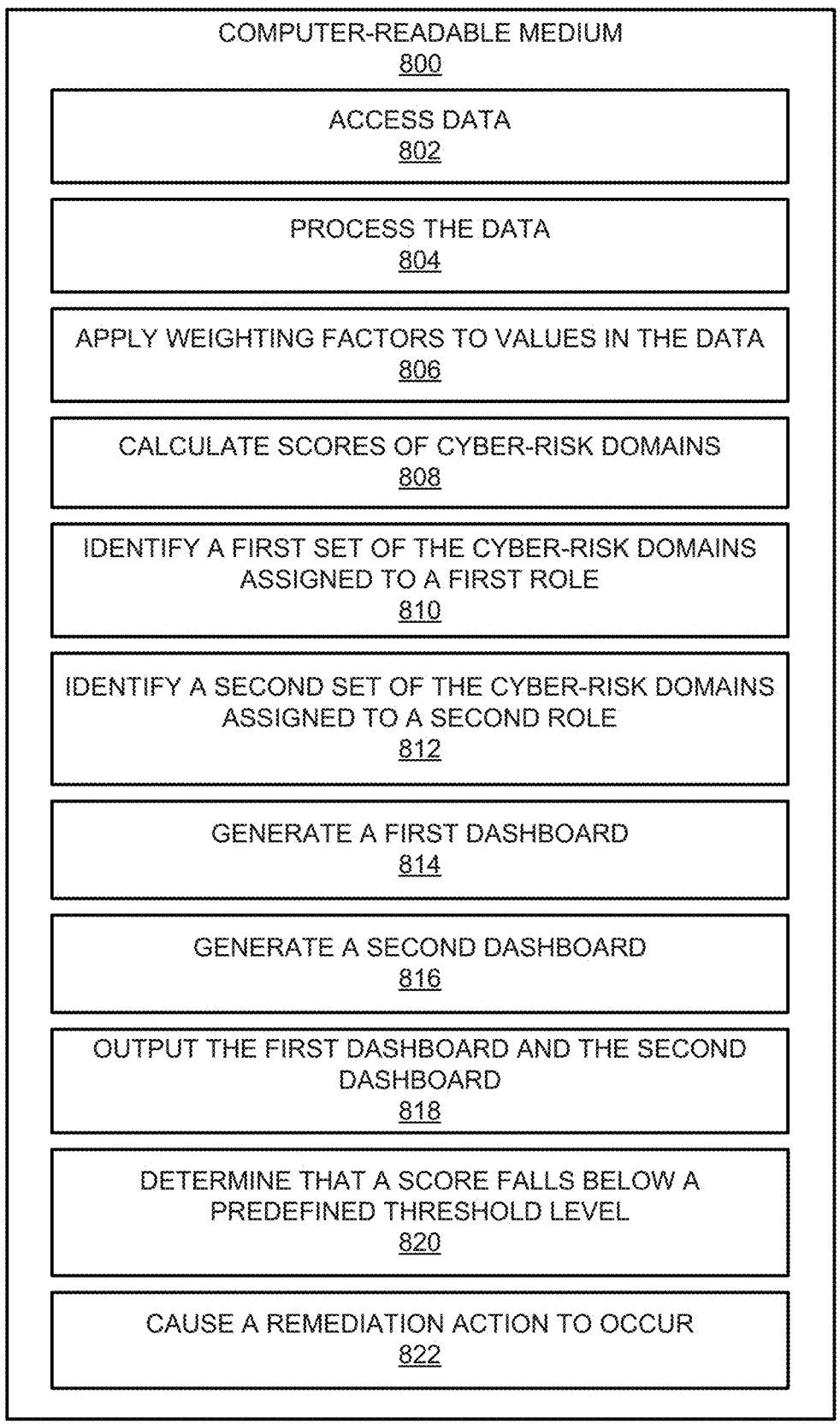
FIG. 8 shows a block diagram of a computer-readable medium that has stored thereon computer-readable instructions for monitoring and enhancing a cybersecurity posture of an organization, in accordance with an embodiment of the present disclosure.

Turning now to FIG. 8, there is shown a block diagram of a computer-readable medium 800 that has stored thereon computer-readable instructions for monitoring and enhancing a cybersecurity posture of an organization, in accordance with an embodiment of the present disclosure. It should be understood that the computer-readable medium 800 depicted in FIG. 8 may include additional instructions and that some of the instructions described herein may be removed and/or modified without departing from the scope of the computer-readable medium 800 disclosed herein. In some examples, the computer-readable medium 800 is a non-transitory computer-readable medium, in which the term "non-transitory" does not encompass transitory propagating signals.

The computer-readable medium 800 has stored thereon computer-readable instructions 802-822 that a processor, such as the processor 104 of the apparatus 102 depicted in FIGS. 1 and 2, is to execute. The computer-readable medium 800 is an electronic, magnetic, optical, or other physical storage device that contains or stores executable instructions. The computer-readable medium 800 is, for example, Random Access memory (RAM), an Electrically Erasable Programmable Read-Only Memory (EEPROM), a storage device, or an optical disc.

The processor is to fetch, decode, and execute the instructions 802 to access data related to cybersecurity of an organization, in which the data is in disparate forms with respect to each other. The processor is to fetch, decode, and execute the instructions 804 to process the accessed data to enable values contained in the accessed data to be interoperable with each other. The processor is to fetch, decode, and execute the instructions 806 to identify and apply weighting factors to the values to generate weighted values. The processor is to fetch, decode, and execute the instructions 808 to calculate, from the weighted values, scores 308 of a plurality of cyber-risk domains 300, 310, 320 related to cybersecurity of an organization.

The processor is to fetch, decode, and execute the instructions 810 to identify a first set of the plurality of cyber-risk domains 300 that are assigned to a first role in the organization. The processor is to fetch, decode, and execute the instructions 812 to identify a second set of the plurality of cyber-risk domains 310 that are assigned to a second role in the organization, in which at least one of the cyber-risk domains in the second set of the plurality of cyber-risk domains 310 differs from at least one of the cyber-risk domains in the first set of the plurality of cyber-risk domains.

The processor is to fetch, decode, and execute the instructions 814 to generate a first dashboard 118a to include the first set of the plurality of cyber-risk domains 300 and the calculated scores 308 of the first set of the plurality of cyber-risk domains 300. The processor is to fetch, decode, and execute the instructions 816 to generate a second dashboard 118b to include the second set of the plurality of cyber-risk domains 310 and the calculated scores 308 of the second set of the plurality of cyber-risk domains 310. The processor is to fetch, decode, and execute the instructions 818 to output the first dashboard 118a to a first entity 140a that is assigned to the first role and to output the second dashboard 118b to a second entity 140b that is assigned to the second role.

In some examples, the processor is to fetch, decode, and execute instructions to receive a request for additional information regarding a feature displayed in the first dashboard. In these examples, the processor is to fetch, decode, and execute instructions to access the additional information regarding the feature and to generate an information table to include the additional information. The processor is further to fetch, decode, and execute instructions to output the information table.

In some examples, the processor is to fetch, decode, and execute instructions 820 to determine that a calculated score of the calculated scores falls below a predefined threshold level. In addition, the processor is to fetch, decode, and execute instructions 822 to cause a remediation action related to the cyber-risk domain corresponding to the calculated score to occur.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   at least one processor;
   a non-transitory processor readable medium storing machine-readable instructions that cause the at least one processor to:
   normalize values in data collected from multiple data sources to enable the values to be interoperable with each other;
   apply predetermined weighting factors to the normalized values to generate weighted values;
   calculate, from the weighted values, scores for a plurality of cyber-risk domains related to cybersecurity of an organization, wherein the values in the data collected from multiple data sources are normalized to cause the scores to be between a lower limit value and an upper limit value, and wherein the plurality of cyber-risk domains are related to cybersecurity postures of various divisions within the organization;
   identify a first set of the plurality of cyber-risk domains that are assigned to a first role in the organization;
   identify a second set of the plurality of cyber-risk domains that are assigned to a second role in the organization, wherein the second set of the plurality of cyber-risk domains differs from the first set of the plurality of cyber-risk domains;
   generate a first dashboard to include the first set of the plurality of cyber-risk domains and the calculated scores for the first set of the plurality of cyber-risk domains;
   generate a second dashboard to include the second set of the plurality of cyber-risk domains and the calculated scores for the second set of the plurality of cyber-risk domains; and output the first dashboard and the second dashboard to enable monitoring and remediation of cybersecurity issues in the organization.

2. The apparatus of claim 1, wherein the organization includes a plurality of divisions, and wherein the instructions cause the at least one processor to:
identify the cyber-risk domains and scores that respectively correspond to the plurality of divisions; and
generate the first dashboard and the second dashboard to include the identified cyber-risk domains and scores corresponding to the plurality of divisions to provide comprehensive and simultaneous monitoring of cybersecurity issues associated with the plurality of divisions of the organization.

3. The apparatus of claim 1, wherein the instructions cause the at least one processor to:
determine severity levels of the first set and the second set of the plurality of cyber-risk domains based on the calculated scores for the first set and the second set of the plurality of cyber-risk domains;
generate the first dashboard to graphically depict the determined severity levels of the first set of the plurality of cyber-risk domains; and
generate the second dashboard to graphically depict the determined severity levels of the second set of the plurality of cyber-risk domains.

4. The apparatus of claim 1, wherein the instructions cause the at least processor to:
calculate updated scores for the plurality of cyber-risk domains;
generate an updated first dashboard to include the updated scores and the scores for the first set of the plurality of cyber-risk domains; and
generate an updated second dashboard to include the updated scores and the scores for the second set of the plurality of cyber-risk domains.

5. The apparatus of claim 1, wherein the instructions cause the at least one processor to:
receive a request for additional information regarding a feature displayed in the first dashboard;
access the additional information regarding the feature;
generate an information table to include the additional information; and
output the information table.

6. The apparatus of claim 1, wherein the instructions cause the at least one processor to:
rationalize the values in the collected data.

7. The apparatus of claim 1, wherein the instructions cause the at least one processor to:
collect the data from multiple data sources;
catalog the normalized data to the plurality of cyber-risk domains;
tag the cataloged data; and
calculate the respective scores based on the tagged data.

8. The apparatus of claim 7, wherein the instructions cause the at least one processor:
apply summarization and aggregation rules to the collected data to generate a reduced size data collection; and
apply a set of rules on the reduced size data collection to calculate the scores for the plurality of cyber-risk domains.

9. The apparatus of claim 1, wherein the instructions cause the at least one processor to:
determine that a calculated score of the calculated scores falls below a predefined threshold level; and
at least one of:
output an alert responsive to the determination that the calculated score falls below the predefined threshold level; and
cause a remediation action related to the cyber-risk domain corresponding to the calculated score to occur.

10. The apparatus of claim 1, wherein the instructions cause the at least one processor to:
output the first dashboard and the second dashboard to enable real-time monitoring and remediation of cybersecurity issues in the organization.

11. A method comprising:
accessing, by a processor, data related to cybersecurity of an organization, the data being in multiple forms with respect to each other;
normalizing, by the processor, the accessed data to enable values contained in the accessed data to be interoperable with each other;
applying weighting factors to be applied to the values to generate weighted values;
calculating, by the processor and from the weighted values, scores for a plurality of cyber-risk domains related to the cybersecurity of the organization from the accessed data, wherein the values in the accessed collected are normalized to cause the scores to be between a lower limit value and an upper limit value, and wherein the plurality of cyber-risk domains are related to cybersecurity postures of various divisions within the organization;
identifying, by the processor, a first set of the plurality of cyber-risk domains that are assigned to a first role in the organization;
identifying, by the processor, a second set of the plurality of cyber-risk domains that are assigned to a second role in the organization;
generating, by the processor, a first dashboard that includes the first set of the plurality of cyber-risk domains and the calculated scores for the first set of the plurality of cyber-risk domains;
generating, by the processor, a second dashboard that includes the second set of the plurality of cyber-risk domains and the calculated scores for the second set of the plurality of cyber-risk domains;
outputting, by the processor, the first dashboard to a first entity that is assigned the first role; and
outputting, by the processor, the second dashboard to a second entity that is assigned the second role to enable monitoring and remediation of cybersecurity issues in the organization.

12. The method of claim 11, wherein the organization includes a plurality of divisions, and wherein the method further comprises:
identifying the cyber-risk domains and scores that respectively correspond to the plurality of divisions; and
generating the first dashboard and the second dashboard to include the identified cyber-risk domains and scores corresponding to the plurality of divisions to provide comprehensive and simultaneous monitoring and remediation of cybersecurity issues associated with the plurality of divisions of the organization.

13. The method of claim 11, further comprising:
determining severity levels of the first set and the second set of the plurality of cyber-risk domains based on the calculated scores for the first set and the second set of the plurality of cyber-risk domains;

generating the first dashboard to graphically depict the determined severity levels of the first set of the plurality of cyber-risk domains; and generating the second dashboard to graphically depict the determined severity levels of the second set of the plurality of cyber-risk domains.

14. The method of claim 11, further comprising:

accessing additional data related to the cybersecurity of the organization;

calculating updated scores for the plurality of cyber-risk domains from the additional data;

generating an updated first dashboard to include the updated scores and the scores for the first set of the plurality of cyber-risk domains; and generating an updated second dashboard to include the updated scores and the scores for the second set of the plurality of cyber-risk domains.

15. The method of claim 11, further comprising:

receiving a request for additional information regarding a feature displayed in the first dashboard;

accessing the additional information regarding the feature;

generating an information table to include the additional information; and outputting the information table.

16. The method of claim 11, further comprising:

accessing the data from multiple data sources;

cataloging the processed data to the plurality of cyber-risk domains;

tagging the cataloged data; and calculating the respective scores based on the tagged data.

17. The method of claim 11, further comprising:

determining that a calculated score of the calculated scores falls below a predefined threshold level; and at least one of:
outputting an alert responsive to the determination that the calculated score falls below the predefined threshold level; and
causing a remediation action related to the cyber-risk domain corresponding to the calculated score to occur.

18. A non-transitory computer-readable storage medium comprising machine-readable instructions that cause a processor to:

access data related to cybersecurity of an organization, the data being in disparate forms with respect to each other;

normalize the accessed data to enable values contained in the accessed data to be interoperable with each other;

identify weighting factors to be applied to the values;

apply the identified weighting factors to the values to generate weighted values;

calculate, from the weighted values, scores for a plurality of cyber-risk domains related to the cybersecurity of the organization, wherein the values contained in the access data are normalized to cause the scores to be between a lower limit value and an upper limit value, and wherein the plurality of cyber-risk domains are related to cybersecurity postures of various divisions within the organization;

identify a first set of the plurality of cyber-risk domains that are assigned to a first role in the organization;

identify a second set of the plurality of cyber-risk domains that are assigned to a second role in the organization, wherein the second set of the plurality of cyber-risk domains differs from the first set of the plurality of cyber-risk domains;

generate a first dashboard to include the first set of the plurality of cyber-risk domains and the calculated scores for the first set of the plurality of cyber-risk domains;

generate a second dashboard to include the second set of the plurality of cyber-risk domains and the calculated scores for the second set of the plurality of cyber-risk domains; and output the first dashboard and the second dashboard to enable cybersecurity issues of the organization to be monitored and remediated.

19. The non-transitory computer-readable storage medium of claim 18, wherein the instructions further cause the processor to:

receive a request for additional information regarding a feature displayed in the first dashboard;

access the additional information regarding the feature;

generate an information table to include the additional information; and output the information table.

20. The non-transitory computer-readable storage medium of claim 18, wherein the instructions further cause the processor to:

determine that a calculated score of the calculated scores exceeds a predefined threshold level; and cause a remediation action related to the cyber-risk domain corresponding to the calculated score to occur.

* * * * *